(12) United States Patent
Ohtsuka et al.

(10) Patent No.: US 8,926,165 B2
(45) Date of Patent: Jan. 6, 2015

(54) AGITATION MIXING APPARATUS

(75) Inventors: Masaki Ohtsuka, Osaka (JP); Kazuya Kitatani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1136 days.

(21) Appl. No.: 12/935,113

(22) PCT Filed: Apr. 3, 2009

(86) PCT No.: PCT/JP2009/056946
§ 371 (c)(1),
(2), (4) Date: Sep. 28, 2010

(87) PCT Pub. No.: WO2009/125725
PCT Pub. Date: Oct. 15, 2009

(65) Prior Publication Data
US 2011/0026357 A1 Feb. 3, 2011

(30) Foreign Application Priority Data

Apr. 7, 2008 (JP) ................................. 2008-099136
Apr. 9, 2008 (JP) ................................. 2008-101245

(51) Int. Cl.
*B01F 11/00* (2006.01)
*B01F 3/08* (2006.01)
*A01J 11/10* (2006.01)
*A01J 15/26* (2006.01)
*B01F 15/00* (2006.01)

(52) U.S. Cl.
CPC .............. *B01F 3/0807* (2013.01); *A01J 11/10* (2013.01); *A01J 15/26* (2013.01); *B01F 11/0082* (2013.01); *B01F 11/0091* (2013.01); *B01F 15/00883* (2013.01)
USPC .............. 366/78; 366/130; 366/256; 366/307

(58) Field of Classification Search
USPC ............... 366/78, 79–90, 278, 332, 307, 209, 366/130, 256
See application file for complete search history.

(56) References Cited

U.S. PATENT DOCUMENTS

| | | | | | |
|---|---|---|---|---|---|
| 1,849,291 | A | * | 3/1932 | Gordon | 366/82 |
| 1,849,292 | A | * | 3/1932 | Gordon | 366/83 |
| 2,200,997 | A | * | 5/1940 | Royle | 366/80 |
| 2,242,364 | A | * | 5/1941 | Montanari | 366/87 |
| 2,639,464 | A | * | 5/1953 | Magerkurth | 366/80 |
| 2,829,399 | A | * | 4/1958 | Caracciolo et al. | 425/203 |
| 3,045,283 | A | * | 7/1962 | Keiser | 366/76.9 |
| 3,102,694 | A | * | 9/1963 | Frenkel | 241/251 |

(Continued)

FOREIGN PATENT DOCUMENTS

| | | | |
|---|---|---|---|
| DE | 1 142 839 | B  * | 1/1963 |
| JP | 49-46350 | B | 12/1974 |

(Continued)

*Primary Examiner* — Tony G Soohoo
(74) *Attorney, Agent, or Firm* — Birch, Stewart, Kolasch & Birch, LLP

(57) ABSTRACT

In an agitation mixing apparatus 51 which includes: a casing 52 having a flow path 56 in which a fluid flows; an agitator 53 which is disposed inside the casing 52 and includes a shaft 57 and a vane 58 mounted around the shaft 57; and a drive source 59, connected to the shaft 57, for vibrating the agitator 53 in an axial direction, grooves 71 are provided on an inner wall surface of the casing 52 at predetermined intervals in the axial direction.

5 Claims, 24 Drawing Sheets

(56) References Cited

U.S. PATENT DOCUMENTS

| | | | | |
|---|---|---|---|---|
| 3,102,716 | A | * | 9/1963 | Frenkel .................. 366/88 |
| 3,164,375 | A | * | 1/1965 | Frenkel .................. 366/88 |
| RE26,147 | E | * | 1/1967 | Parshall et al. .............. 366/80 |
| 3,517,095 | A | * | 6/1970 | Dunnington et al. ..... 264/211.21 |
| 3,876,188 | A | * | 4/1975 | Koch et al. .................. 366/78 |
| 4,136,969 | A | * | 1/1979 | Meyer .................. 366/88 |
| 4,192,617 | A | * | 3/1980 | Spielhoff .................. 366/83 |
| 4,419,014 | A | * | 12/1983 | Gale .................. 366/99 |
| 4,779,989 | A | * | 10/1988 | Barr .................. 366/90 |
| 4,963,033 | A | * | 10/1990 | Huber et al. .................. 366/81 |
| 5,056,925 | A | * | 10/1991 | Klein .................. 366/90 |
| 5,098,267 | A | * | 3/1992 | Cheng .................. 425/4 R |
| 5,318,358 | A | * | 6/1994 | Wobbe et al. .................. 366/90 |
| 5,421,650 | A | * | 6/1995 | Meyer .................. 366/88 |
| 6,296,384 | B1 | | 10/2001 | Yatomi et al. |
| 6,609,818 | B1 | * | 8/2003 | Fogarty .................. 366/90 |
| 7,331,702 | B2 | * | 2/2008 | Taniguchi .................. 366/118 |
| 7,476,416 | B2 | * | 1/2009 | Tynan et al. .............. 427/207.1 |
| 2002/0067656 | A1 | * | 6/2002 | Schuchardt .................. 366/80 |
| 2005/0048169 | A1 | | 3/2005 | Delouis |
| 2009/0027997 | A1 | | 1/2009 | Meier |
| 2011/0026357 | A1 | * | 2/2011 | Ohtsuka et al. .............. 366/118 |

FOREIGN PATENT DOCUMENTS

| | | |
|---|---|---|
| JP | 61-242810 A | 10/1986 |
| JP | 1-84733 U | 6/1989 |
| JP | 2-150023 U | 12/1990 |
| JP | 3-59035 U | 6/1991 |
| JP | 7-51557 A | 2/1995 |
| JP | 11-57441 A | 3/1999 |
| JP | 11-276871 A | 10/1999 |
| JP | 2002-136974 A | 5/2002 |
| JP | 2003-47869 A | 2/2003 |
| JP | 2004-160049 A | 6/2004 |
| JP | 2005-53582 A | 3/2005 |
| JP | 2005-279590 A | 10/2005 |
| WO | WO 00/10883 A1 | 3/2000 |
| WO | WO-2007/038893 A1 | 4/2007 |

* cited by examiner

FIG.3A
FIG.3B
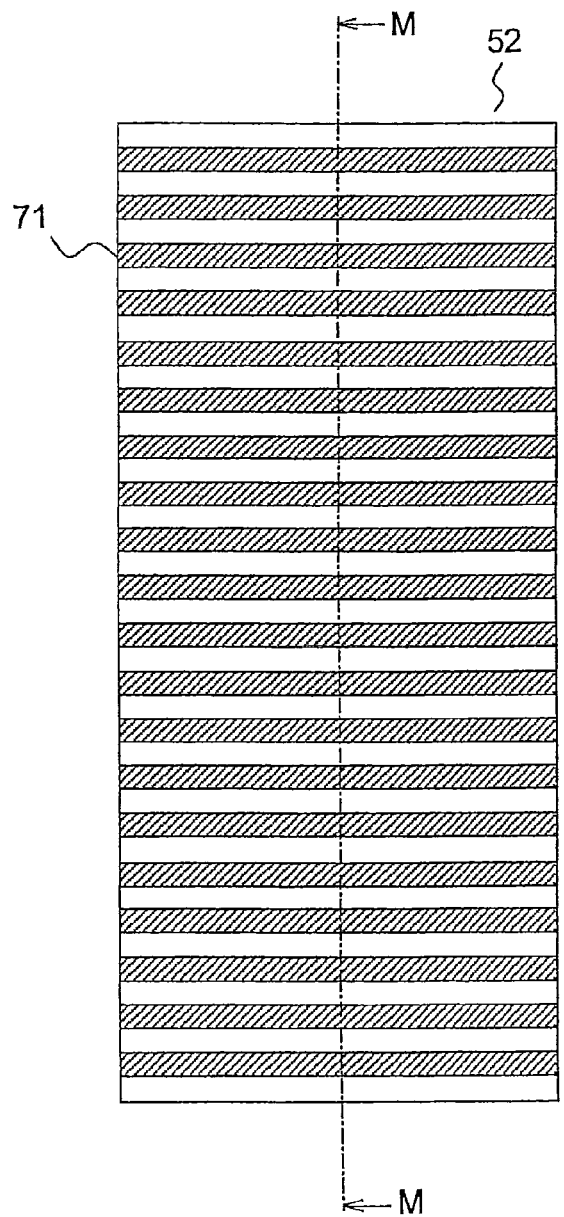
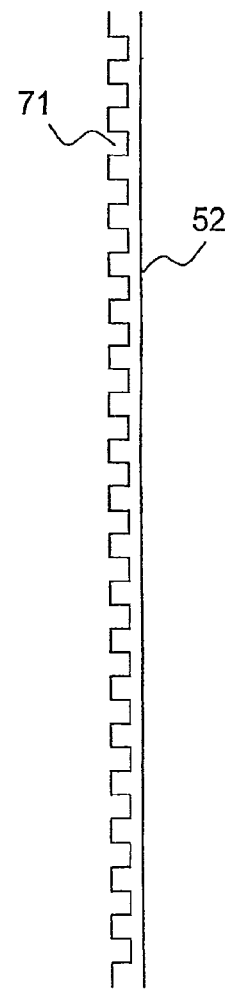

AGITATION MIXING APPARATUS

TECHNICAL FIELD

The present invention relates to an agitation mixing apparatus for agitating and mixing a flowing fluid.

BACKGROUND ART

A conventional agitation mixing apparatus for agitating and mixing a fluid is disclosed in Patent Literatures 1 and 2. The agitation mixing apparatus includes, in a cylindrical casing, a helical vane connected to a vibration source. Plural kinds of fluids are supplied into the casing, and the fluids are agitated and mixed by means of the vane which vibrates in the axial direction. Thus, the agitation mixing apparatus as described above can be used for, for example, production of an emulsion, agitators for use in apparatuses for performing pH adjustment and/or causing chemical reaction such as oxidation-reduction reaction, and agitators for use in extractors.

CITATION LIST

Patent Literature

Patent Literature 1: Japanese Laid-Open Patent Publication No. 7-51557 (page 3 to page 4, FIG. 2)
Patent Literature 2: Japanese Laid-Open Patent Publication No. 11-57441 (page 3 to page 4, FIG. 1)
Patent Literature 3: Japanese Laid-Open Patent Publication No. 2005-53582 (page 3 to page 5, FIG. 2)
Patent Literature 4: Japanese Laid-Open Utility Model Publication No. 2-150023 (page 5 to page 9, FIG. 1)

SUMMARY OF THE INVENTION

Problems to be Solved by the Invention

In recent years, an agitating and mixing process is performed in the biochemical field in accordance with development of biotechnology, and the need for the agitating and mixing process, and a range of applications thereof tends to be expanded. Therefore, in response to the industrial demand, the agitation mixing apparatus which enables increased improvement of an agitating efficiency and a mixing efficiency is needed.

An object of the present invention is to provide an agitation mixing apparatus which enables increased improvement of an agitating efficiency and a mixing efficiency.

Solution to the Problems

In order to attain the object described above, the present invention is directed to an agitation mixing apparatus which includes: a casing having a flow path in which a fluid flows; an agitator which is disposed inside the casing and includes a shaft and a vane mounted around the shaft; and a drive source, connected to the shaft, for vibrating the agitator in an axial direction, and, in the agitation mixing apparatus, grooves are provided on an inner wall surface of the casing at predetermined intervals in the axial direction.

In these features, when a fluid containing one type or plural types of fluid and/or solid particles is supplied into the casing, the agitator is driven so as to vibrate in the axial direction by the drive source. The grooves are formed in a helical shape or annular shapes on the inner wall surface of the casing at predetermined intervals in the axial direction. A part of the fluid flowing along the casing flows into the grooves, and vortexes are generated in the grooves. The vortexes are generated in the grooves so as to reverse their rotation direction in accordance with the agitator being vibrated in the axial direction, so that the immediately preceding vortexes are broken, and a great sheer force occurs in the fluid. Thus, the fluid containing one type or plural types of fluid and/or solid particles is agitated and mixed, thereby producing an emulsion. The intervals of the grooves in the axial direction may be regular or may not be regular.

Further, according to the present invention, in the agitation mixing apparatus having the features described above, side walls of the grooves are formed so as to be orthogonal to the axial direction.

Further, according to the present invention, in the agitation mixing apparatus having the features described above, the vane and the grooves are formed in helical shapes, respectively, having a same twisting direction.

Further, according to the present invention, in the agitation mixing apparatus having the features described above, the agitator has a plurality of the vanes, each formed in a helical shape, so as to have twisting directions different from each other, and the grooves are formed in helical shapes so as to have a same twisting direction as opposing ones of the plurality of the vanes. In these features, a plurality of vortexes having different planes of rotation are generated.

Further, according to the present invention, in the agitation mixing apparatus having the features described above, recessed portions and projecting portions are provided on a surface of the vane. In these features, the recessed portions and the projecting portions provided on the vane collide with the fluid by vibration from the drive source, thereby enhancing a shear force occurring in the fluid.

Further, according to the present invention, in the agitation mixing apparatus having the features described above, the vane has the recessed portions and the projecting portions on both surfaces thereof, to contact with a fluid, and the recessed portions formed on one surface and the recessed portions on a surface reverse of the one surface share common side walls, and the recessed portions are radially positioned at predetermined angular intervals.

In these features, the vane is formed by, for example, a thin metal or resin being bent. The recessed potions and the projecting portions are formed on one surface, and the recessed portions are also formed on the reverse side of the projecting portions formed on the one surface, and the projecting portions are also formed on the reverse side of the recessed portions formed on the one surface. The recessed portions and the projecting portions are radially formed, and vortexes are generated in the recessed portions by vibration from the drive source. Further, when the vane has a helical shape, strong vortexes are generated in the recessed portions due to a flow of a fluid along slopes of the vane.

Further, according to the present invention, in the agitation mixing apparatus having the features described above, the agitator is rotated about the shaft by the drive source being driven. In these features, a part of a fluid flowing along the surface of the vane flows into the recessed portions which are radially formed, due to rotation of the agitator, so that vortexes are generated in the recessed portions.

Further, according to the present invention, in the agitation mixing apparatus having the features described above, the agitator repeats a forward rotation and a reverse rotation in a cyclic manner. In these features, the forward rotation of the agitator causes vortexes to be generated in the recessed portions, whereas the reverse rotation of the agitator causes vortexes rotating in the reverse direction to be generated in the recessed portions. Thus, the immediately preceding vortexes are broken in the recessed portions, and a great shear force occurs in a fluid.

Further, according to the present invention, in the agitation mixing apparatus having the features described above, a width and a depth of each groove are almost equal to each other.

Further, according to the present invention, in the agitation mixing apparatus having the features described above, side walls of the grooves are each formed so as to have a radius of curvature which is less than or equal to 1 mm, at an end portion on an open side.

Further, according to the present invention, in the agitation mixing apparatus having the features described above, an amplitude of a vibration of the agitator caused by the drive source is greater than a width of each groove.

Further, the present invention is directed to an agitating vessel for dispersing or separating, by a liquid contained therein being shaken and agitated, the agitated liquid, and the agitating vessel includes: an outer cylinder of a cylindrical shape which has an opening at a top portion and a closed bottom; and a lid which detachably closes the opening; and an inner cylinder of a cylindrical shape which is disposed inside the outer cylinder, and, in the agitating vessel, grooves are aligned at predetermined intervals in an axial direction on one or both of an inner circumferential surface and an outer circumferential surface of the inner cylinder.

In these features, for example, a liquid forming an oil phase and a liquid forming an aqueous phase are contained in the outer cylinder of the agitating vessel, and the opening is closed by the lid. When the agitating vessel is shaken, the contained liquids are shaken upward and downward along the inner cylinder and the outer cylinder. The grooves formed in a helical shape or annular shapes are aligned on the inner circumferential surface or the outer circumferential surface of the inner cylinder in the axial direction. A part of liquids flowing along the inner cylinder flow into the grooves, and vortexes are generated in the grooves. The vortexes are generated in the grooves so as to reverse their rotation direction in accordance with the agitating vessel being shaken in the axial direction, so that the immediately preceding vortexes are broken, and a great sheer force occurs in the liquids. Thus, the liquid of the aqueous phase and the liquid of the oil phase are dispersed, to produce a dispersed liquid which is approximate to an emulsion. Therefore, even when a shaking force and/or the number of times of the shaking are reduced, a liquid such as a separate liquid dressing can be sufficiently dispersed, or a liquid such as milk can be sufficiently separated. The same can be said for a case where a liquid and powder are contained in the outer cylinder to produce a dispersed liquid (suspension).

Further, according to the present invention, in the agitating vessel having the features described above, the grooves are formed on the inner circumferential surface and the outer circumferential surface of the inner cylinder by circumferential wall of the inner cylinder being bent, and the grooves on the inner circumferential side and the grooves on the outer circumferential side share common side walls. In these features, the inner cylinder is formed of a thin resin material or the like, and the grooves on the outer circumferential side are formed on the reverse side of the projections which are formed between the grooves formed on the inner circumferential side of the inner cylinder.

Further, according to the present invention, in the agitating vessel having the features described above, the grooves are further formed on an inner circumferential surface of the outer cylinder so as to be aligned at predetermined intervals in the axial direction.

Further, according to the present invention, in the agitating vessel having the features described above, the grooves provided on the inner circumferential surface of the outer cylinder and the grooves provided on the outer circumferential surface of the inner cylinder are disposed so as to be opposed to each other.

Further, according to the present invention, in the agitating vessel having the features described above, a communication portion for communicating between an inside and an outside of the inner cylinder is provided. In these features, a liquid contained in the outer cylinder flows between the inside and the outside of the inner cylinder through the communication portion provided at the lower portion of the inner cylinder or below the inner cylinder, for example.

Further, according to the present invention, in the agitating vessel having the features described above, a width and a depth of each groove are almost equal to each other.

Further, according to the present invention, in the agitating vessel having the features described above, side walls of the grooves are formed so as to be orthogonal to the axial direction.

Further, according to the present invention, in the agitating vessel having the features described above, when a representative length of a cross section of the outer cylinder is represented as L, the width of each groove is greater than or equal to L/8, and is not greater than L/2. The representative length L is a diameter when the outer cylinder has a circular cross section, or the representative length L is a length of one side when the outer cylinder has a rectangular cross section.

Further, according to the present invention, in the agitating vessel having the features described above, the side walls of the grooves are each formed so as to have a radius of curvature which is less than or equal to 1 mm, at an end portion on an open side.

Further, according to the present invention, in the agitating vessel having the features described above, at least a portion of the outer cylinder is transparent.

Further, the present invention is directed to an agitating vessel for dispersing or separating, by a liquid contained therein being shaken and agitated, the agitated liquid, and the agitating vessel includes: an outer cylinder of a cylindrical shape which has an opening at one end and forms an outer package, and a lid for closing the opening, and, in the agitating vessel, grooves are aligned at predetermined intervals in the axial direction on an inner circumferential surface of the outer cylinder, and a width and a depth of each groove are almost equal to each other.

In these features, for example, a liquid forming an oil phase and a liquid forming an aqueous phase are contained in the outer cylinder of the agitating vessel, and the opening is closed by the lid. When the agitating vessel is shaken, the contained liquids are shaken upward and downward along the outer cylinder. At this time, a part of the liquids flowing along the outer cylinder flows into the grooves, and vortexes are generated in the grooves. The vortexes are generated in the grooves so as to reverse their rotation direction in accordance with the outer cylinder being shaken upward and downward, so that the immediately preceding vortexes are broken, and a great sheer force occurs in the liquids. Thus, the liquid of the aqueous phase and the liquid of the oil phase are dispersed, to produce a dispersed liquid which is approximate to an emulsion.

Further, a separate liquid dressing according to the present invention is contained in the agitating vessel, having the features described above, which acts as a package container thereof. In these features, contents of the separate liquid dressing include: a liquid forming an aqueous phase containing vinegar as a main component; and a liquid forming an oil phase containing an oil as a main component, and are contained in the outer cylinder of the agitating vessel. When the agitating vessel is shaken, the contained liquids are shaken upward and downward, and the vortexes are generated in the grooves, so that a dispersed liquid which is approximate to an emulsion is produced.

Further, separate liquid cosmetics according to the present invention are contained in the agitating vessel, having the features described above, which acts as a package container thereof. In these features, the contents of the separate liquid cosmetics include: a liquid forming an aqueous phase such as pure water; and a liquid forming an oil phase such as an oil, and are contained in the outer cylinder of the agitating vessel. When the agitating vessel is shaken, the contained liquids are shaken upward and downward, and vortexes are generated in the grooves, so that a dispersed liquid which is approximate to an emulsion is produced.

Further, a pharmaceutical according to the present invention is contained in the agitating vessel, having the features described above, which acts as a package container thereof. In these features, the contents of the pharmaceutical include, for example, powder of a pharmaceutical which is poorly soluble in water, and a liquid such as a saline, and are contained in the outer cylinder of the agitating vessel. When the agitating vessel is shaken, the contained liquid is shaken upward and downward, and vortexes are generated in the grooves, so that a dispersed liquid in which solid particles are dispersed is produced.

Advantageous Effects of the Invention

Moreover, the agitation mixing apparatus according to the present invention includes the grooves which are formed at predetermined intervals in the axial direction of the casing, and therefore vortexes are generated in the grooves so as to reverse their rotation direction in accordance with the agitator being vibrated in the axial direction, so that the immediately preceding vortexes are broken, and a great sheer force occurs in the fluid. Therefore, the agitating efficiency and the mixing efficiency can be enhanced.

BRIEF DESCRIPTION OF THE DRAWINGS

FIGS. 3A and 3B are a development view and a cross-sectional view the agitation mixing apparatus according to the first embodiment of the present invention.

DESCRIPTION OF EMBODIMENTS

First Embodiment

Figure 1:
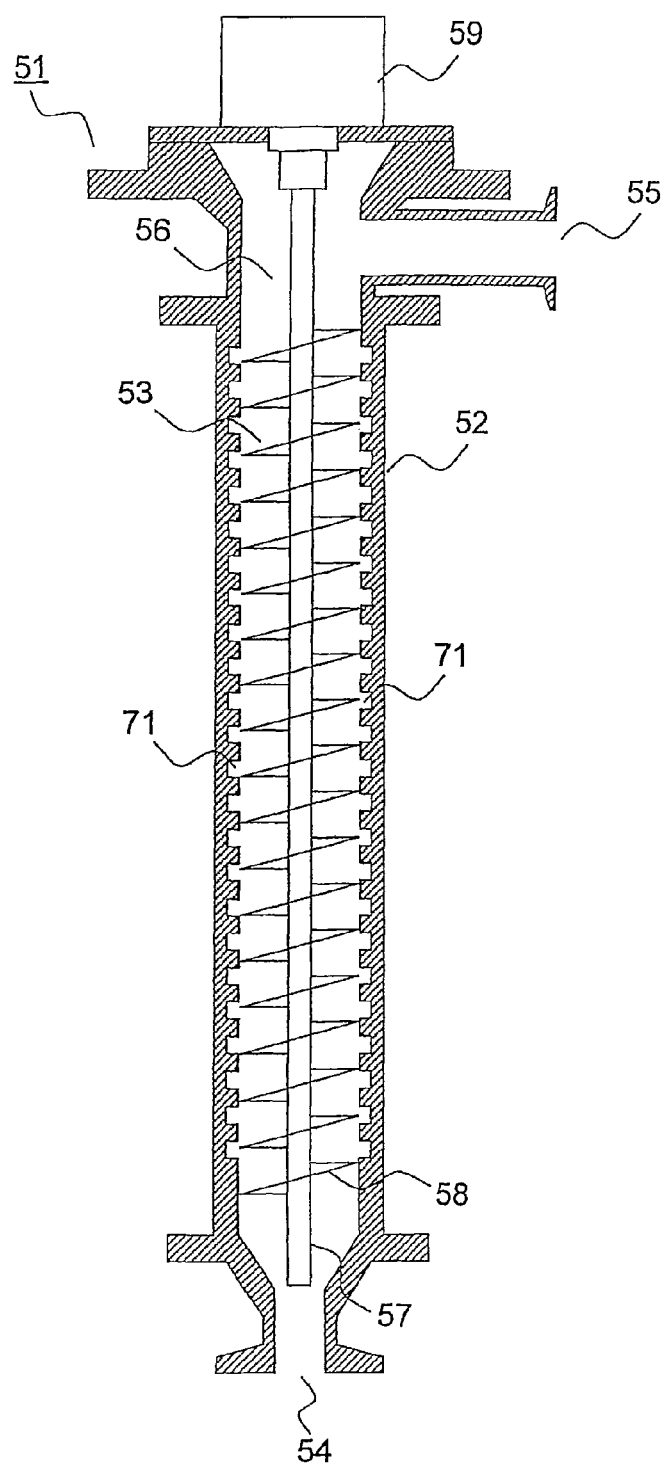
FIG. 1 is a front cross-sectional view of an agitation mixing apparatus according to a first embodiment of the present invention.

Hereinafter, embodiments of the present invention will be described with reference to the drawings. FIG. 1 is a front cross-sectional view of an agitation mixing apparatus according to a first embodiment. An agitation mixing apparatus 51 includes a casing 52 which has an almost cylindrical shape and has a flow path 56 in which fluids flow. The casing 52 may be formed in a prismatic shape having a polygonal cross-section. An inlet 54 through which fluids flow in is located at one end of the flow path 56 of the casing 52, and an outlet 55 through which the fluids flow out is located at the other end thereof.

An agitator 53 which has a helical vane 58 mounted around a shaft 57 is provided in the flow path 56 of the casing 52. The vane 58 is provided, as necessary, with a plurality of through holes (not shown), through which fluids-to-be-mixed 60 (see FIG. 4) are allowed to flow in the axial direction of the agitator 53. For example, either U-shaped notches which are formed at the edge of the vane 58 or round holes which are formed on the surface of the vane 58 may be provided as the through holes. The shaft 57 is connected to a drive source 59, and the agitator 53 is vibrated in the axial direction and/or rotated by the drive source 59 being driven.

Figure 2:
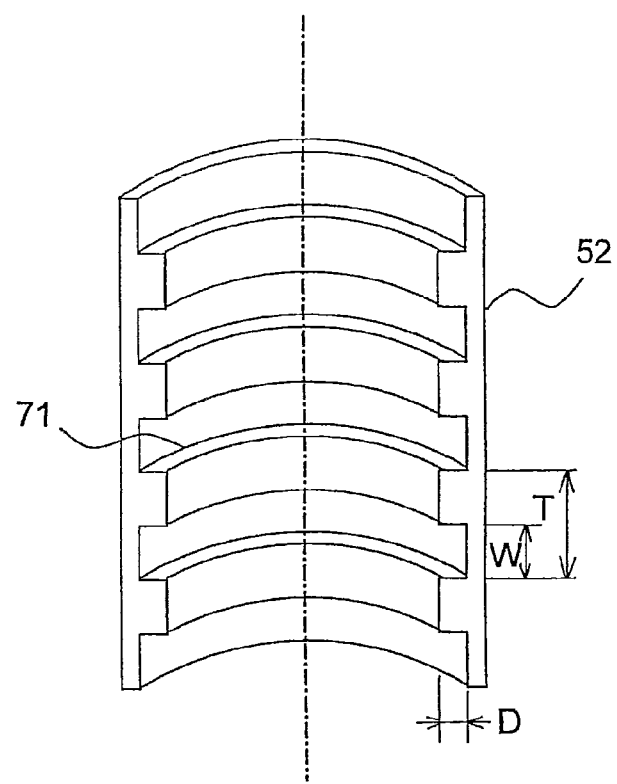
FIG. 2 is a perspective view of an inner surface side of a part of a casing of the agitation mixing apparatus according to the first embodiment of the present invention.

FIG. 2 is a perspective view of a part of an inner surface of the casing 52. FIG. 3A is a development view of a part of the casing 52. FIG. 3B shows a cross section taken along a line M-M shown in FIG. 3A. On the inner wall surface of the casing 52, a plurality of annular grooves 71 are aligned at predetermined intervals T in the axial direction. The intervals T may be regular or may not be regular. The side walls of the grooves 71 are formed so as to be orthogonal to the axial direction. In FIG. 3A, recessed portions of the grooves 71 are represented by diagonal lines.

Figure 4:
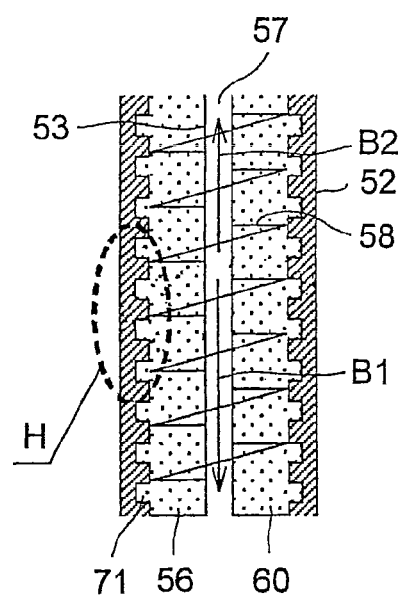
FIG. 4 is a front cross-sectional view illustrating a state in which a drive source is driven in the agitation mixing apparatus according to the first embodiment of the present invention.

When the agitation mixing apparatus 51 is operated, the fluids-to-be-mixed 60 (see FIG. 4) flow through the inlet 54 into the flow path 56 inside the casing 52, and the drive source 59 is driven. FIG. 4 shows a state in which the drive source 59 is driven. The agitator 53 is vibrated by the drive source 59 in the axial direction as indicated by arrows B1 and B2. The fluids-to-be-mixed 60 filling the flow path 56 collide with the vane 58 of the agitator 53, and a shear force occurs in the fluids-to-be-mixed 60. Thus, the fluids-to-be-mixed 60 are agitated and mixed.

Figure 5:
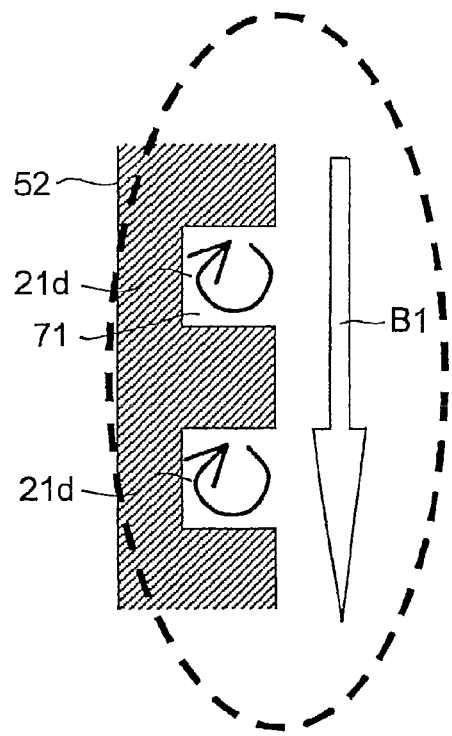
FIG. 5 is a diagram illustrating in detail a portion H, shown in FIG. 4, of an agitator being moved downward.
Figure 6:
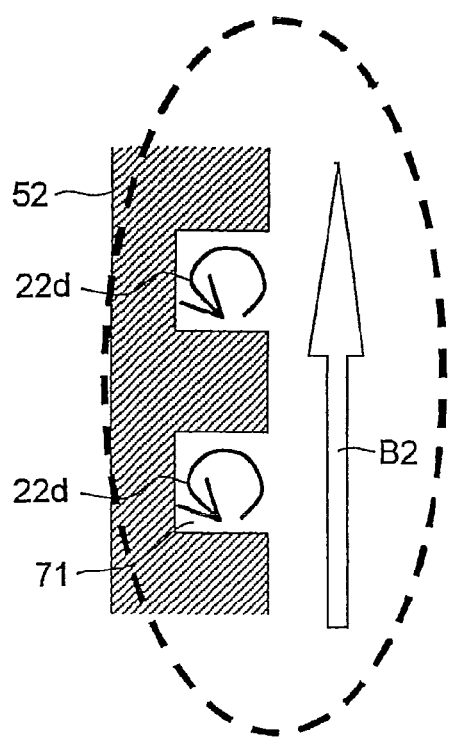
FIG. 6 is a diagram illustrating in detail the portion H, shown in FIG. 4, of the agitator being moved upward.

FIG. 5 and FIG. 6 are diagrams illustrating in detail a portion H shown in FIG. 4, and show cases in which the agitator 53 is moved in the directions indicated by arrows B1 and B2, respectively. When the agitator 53 is moved in the direction indicated by the arrow B1, a part of the fluids-to-be-mixed 60 flowing along the casing 52 flow into the grooves 71 as shown in FIG. 5. Thus, vortexes 21d are generated in the grooves 71 so as to rotate clockwise as shown.

When, immediately after that, the agitator 53 is moved in the direction indicated by the arrow B2, vortexes 22d are generated in the grooves 71 so as to rotate counterclockwise as shown in FIG. 6. That is, the fluids-to-be-mixed 60 flowing into the grooves 71 act so as to cancel the immediately preceding vortexes 21d, and break and eliminate the vortexes 21d, and the vortexes 22d which rotate in the reverse direction develop in the grooves 71.

When, immediately after that, the agitator 53 is moved in the direction indicated by the arrow B1, vortexes 21d are generated in the grooves 71 in the same manner as described above. That is, the fluids-to-be-mixed 60 flowing into the grooves 71 act so as to cancel the immediately preceding vortexes 22d, and break and eliminate the vortexes 22d, and the vortexes 21d which rotate in the reverse direction develop in the grooves 71. Subsequently, these motions are repeated.

When the vortexes 21d and 22d are broken and eliminated, a great shear occurs in the fluids-to-be-mixed 60. Since a plurality of the grooves 71 are provided, a great shear occurs in the fluids-to-be-mixed 60 in each groove 71, and the fluids-to-be-mixed 60 are agitated. The greater the shear occurring in the fluids-to-be-mixed 60 is, the higher the agitating and mixing capability is. Further, generation of the vortexes 21d and 22d is caused by the motion of the fluids which occurs when the agitator 53 is vibrated, and thus the vortexes 21d and 22d can be generated by using little power. Therefore, the agitating and mixing efficiency can be also enhanced.

The fluids-to-be-mixed 60 contain at least one kind of fluid. That is, one kind of fluid may be contained, a plurality of kinds of fluids may be mixed, or a plurality of kinds of fluids may be contained so as to be separated into plural layers, respectively. Further, the fluids-to-be-mixed 60 may be a multiphase fluid such as a fluid containing gas and liquid, a fluid containing solid and liquid, or a fluid containing solid and gas. Specifically, the fluids-to-be-mixed 60 may be, for example, a fluid in which gas and liquid are mixed, may be a fluid in which solid particles of granular material and/or powder material are mixed in gas, or may be a fluid in which solid particles of granular material and/or powder material are mixed in liquid.

Further, the drive source 59 has a microvibration mode in which forward and backward jiggling in the axial direction is repeated, and a reciprocation mode in which a predetermined stroke of forward movement and a predetermined stroke of backward movement in the axial direction are repeated in a predetermined cycle. In the reciprocation mode, the stroke corresponding to an amplitude is greater than the width W of each groove 71. Thus, the strong vortexes 21d and 22d can be securely generated in the grooves 71. In particular, when the fluids-to-be-mixed 60 have a relatively high viscosity, the reciprocation mode is preferably used. When the viscosity of the fluids-to-be-mixed 60 is relatively low, generation of the vortexes 21d and 22d is facilitated, and therefore the microvibration mode may be used.

According to the present embodiment, since the grooves 71 are provided so as to be aligned at predetermined intervals in the axial direction of the casing 52, the vibration of the agitator 53 in the axial direction causes the vortexes 21d and 22d which rotate in the directions reverse of each other to be generated in the grooves 71, so that the immediately preceding vortexes are broken and a great shear force occurs in the fluids-to-be-mixed 60. Therefore, the agitating efficiency and the mixing efficiency can be enhanced.

Further, since the side walls of the grooves 71 are formed so as to be orthogonal to the axial direction, the flow of the fluids-to-be-mixed 60 caused by the reciprocation movement of the agitator 53 being vibrated is orthogonal to the side walls of the grooves 71. Therefore, the flow of the fluids-to-be-mixed 60 caused by the reciprocation movement is efficiently separated at the side walls of the grooves 71, so that the fluids-to-be-mixed 60 efficiently flow into the grooves 71. Thus, the strong vortexes 21d and 22d can be generated in the grooves 71. The higher the strength of each of the vortexes 21d and 22d generated is, the greater the shear occurring in the fluids-to-be-mixed 60 is. Therefore, enhancement of the agitating and mixing capability and the agitating efficiency can be increased.

Figure 7:
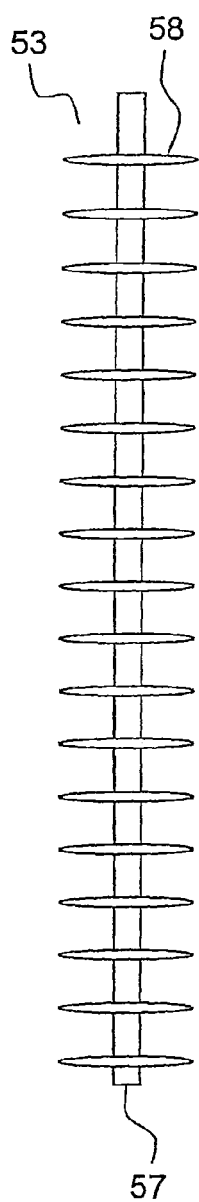
FIG. 7 is a front view of another agitator for use in the agitation mixing apparatus according to the first embodiment of the present invention.

The agitator 53 may have another shape. For example, as shown in FIG. 7, the vane 58 of the agitator 53 may be formed as circular disks which are orthogonal to the shaft 57, and a plurality of the circular disks may be aligned at predetermined intervals. However, when the vane 58 is formed in a helical shape, the fluids-to-be-mixed 60 are moved in the direction along the vane 58 as well as in a direction in which the agitator 53 is moved. Therefore, the shear occurring in the fluids-to-be-mixed 60 is strengthened by the helical vane 58, thereby performing the agitating and mixing with enhanced efficiency.

Figure 8:
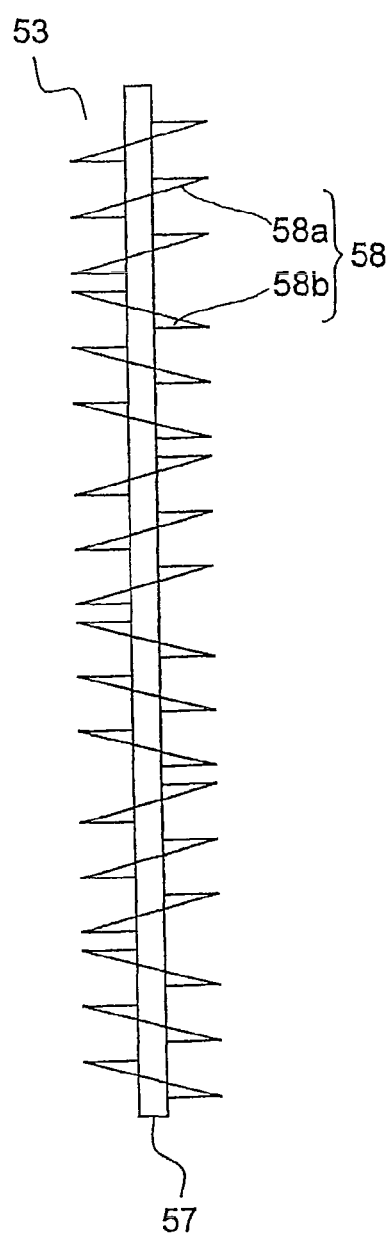
FIG. 8 is a front view of still another agitator for use in the agitation mixing apparatus according to the first embodiment of the present invention.
Figure 9:
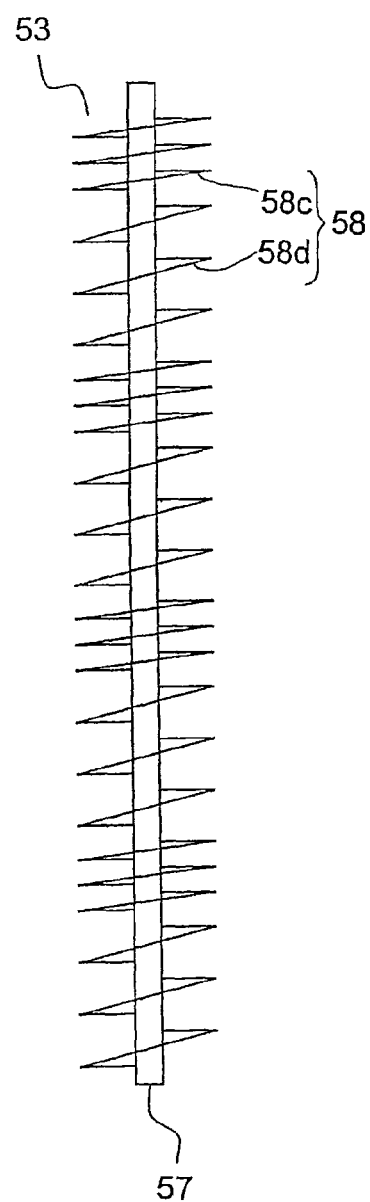
FIG. 9 is a front view of even still another agitator for use in the agitation mixing apparatus according to the first embodiment of the present invention.

Further, as shown in FIG. 8, a plurality of helical vanes 58a and a plurality of helical vanes 58b which have twisting directions different from each other may be alternately provided. Thus, directions in which the fluids-to-be-mixed 60 are moved can be increased in number, so that the shear occurring in the fluids-to-be-mixed 60 can be further strengthened, thereby performing the agitating and mixing with enhanced efficiency. In addition, as shown in FIG. 9, a plurality of helical vanes 58c and a plurality of helical vanes 58d which have intervals different from each other may be alternately provided. Further, the vanes 58 described above may be combined with each other to form the agitator 53.

Furthermore, the agitator 53 may be caused to not only vibrate in the axial direction but also rotate by the drive source 59. In this case, a rotation mode may be provided in which the agitator 53 is rotated in one direction about the shaft 57 which acts as an axis of rotation. Alternatively, a forward and reverse rotation mode may be provided in which a forward rotation and a reverse rotation are repeated in a cyclic manner by using the shaft 57 as an axis of rotation. When the rotation as well as the vibration in the axial direction is used, enhancement of the agitating and mixing efficiency can be increased.

Moreover, when the depth D of each groove 71 is significantly smaller than or greater than the width W thereof, the vortexes 21d and 22d are not likely to be generated in the grooves 71. Therefore, the shear force occurring in the fluids-to-be-mixed 60 is significantly reduced, so that the sufficient dispersion may be prevented. Therefore, it is more preferable that the width W of each groove 71 is almost equal to the depth D thereof.

In addition, when the side walls of the grooves 71 are each formed so as to have an increased radius of curvature at the end portion on the open side, the fluids-to-be-mixed 60 smoothly flow into the grooves 71, so that no strong vortexes are generated. Therefore, the side walls of the grooves 71 are each formed so as to have a radius of curvature which is less than or equal to 1 mm, at the end portion on the open side. Thus, the flow of the fluids-to-be-mixed 60 is separated with enhanced efficiency, and strong vortexes can be generated, thereby increasing enhancement of the agitating and mixing efficiency.

Second Embodiment

Figure 10:
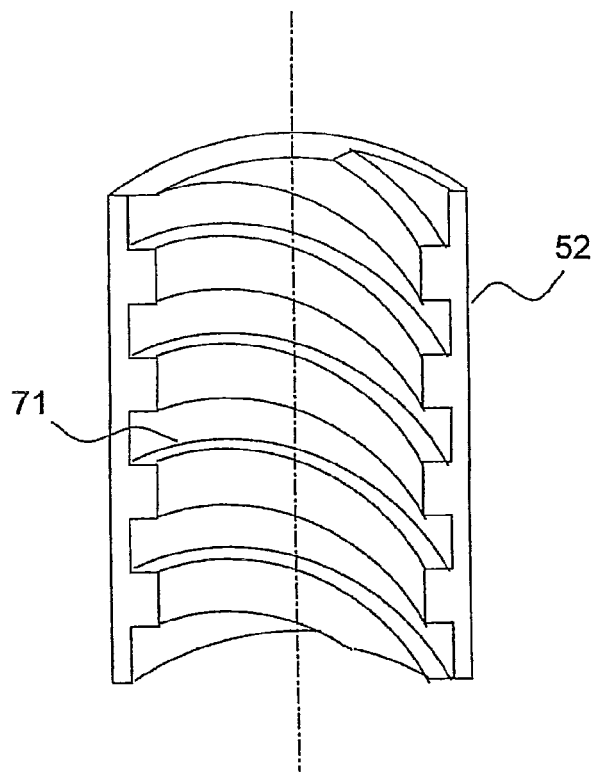
FIG. 10 is a perspective view of an inner surface side of a part of a casing of an agitation mixing apparatus according to a second embodiment of the present invention.
Figure 11:
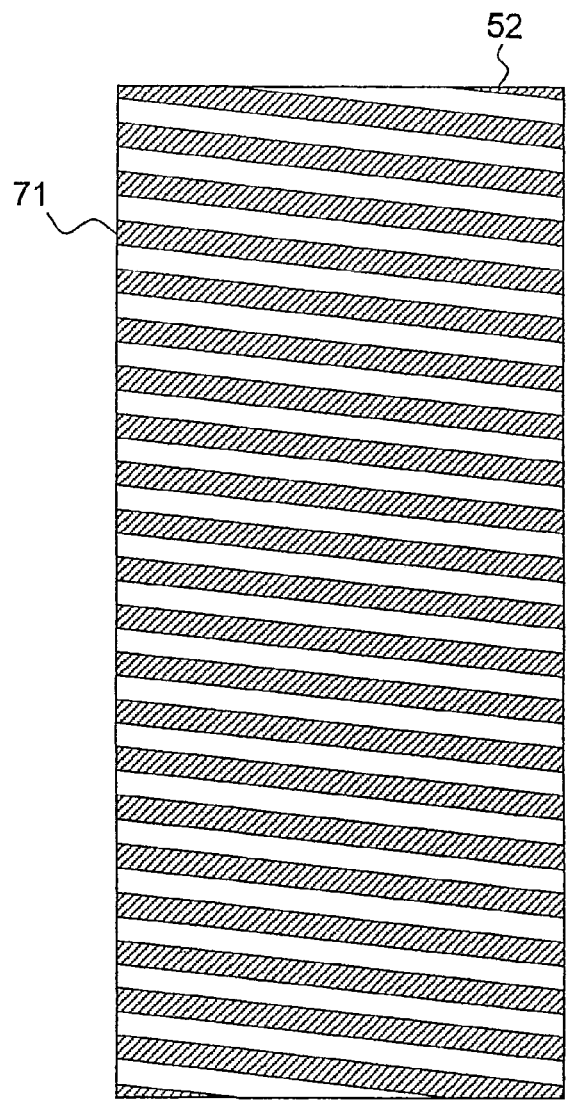
FIG. 11 is a development view of a part of the casing of the agitation mixing apparatus according to the second embodiment of the present invention.

Next, an agitation mixing apparatus 51 according to a second embodiment will be described. In the present embodiment, grooves 71 provided on the inner wall surface of the casing 52 are different from those of the first embodiment. Other portions are the same between the present embodiment and the first embodiment. FIG. 10 and FIG. 11 are a perspective view and a development view, respectively, of a part of the inner surface of the casing 52. For the convenience of description, the same components as previously shown in FIG. 1 to FIG. 9 for the first embodiment are denoted by the same corresponding reference numerals. In FIG. 11, recessed portions of the grooves 71 are represented by diagonal lines.

The vane 58 (see FIG. 1) has a helical shape as in the first embodiment, and the grooves 71 are formed in a helical shape having the same twisting direction as the vane 58. Thus, the grooves 71 are formed at predetermined intervals in the axial direction.

When the agitator 53 is vibrated in the axial direction by the drive source 59 being driven, the fluids-to-be-mixed 60 flow back and forth along the axial direction. In this case, since the fluids-to-be-mixed 60 are moved along the surfaces of the helical vane 58, the fluids-to-be-mixed 60 flow back and forth along the direction which is almost orthogonal to the surfaces of the vane 58. Therefore, the flow of the fluids caused by the back and forth flowing becomes substantially orthogonal to the side walls of the grooves 71. Thus, the shear occurring in the fluids-to-be-mixed 60 can become greater than that of the first embodiment, thereby enhancing the agitating and mixing capability and efficiency.

The intervals for the vane 58 and the intervals for the grooves 71 are more preferably equal to each other. Further, as previously shown in FIG. 9, a plurality of helical vanes 58c and a plurality of helical vanes 58d which have intervals different from each other may be alternately provided. In this case, the grooves 71 opposed to the vanes 58c and 58d may have the same intervals as the vanes 58c and 58d, respectively.

Further, similarly to the first embodiment, the width W of each groove 71 is preferably almost equal to the depth D thereof. In addition, the side walls of the grooves 71 are each formed so as to have a radius of curvature which is less than or equal to 1 mm, at the end portion on the open side, thereby increasing enhancement of the agitating and mixing efficiency.

Third Embodiment

Figure 12:
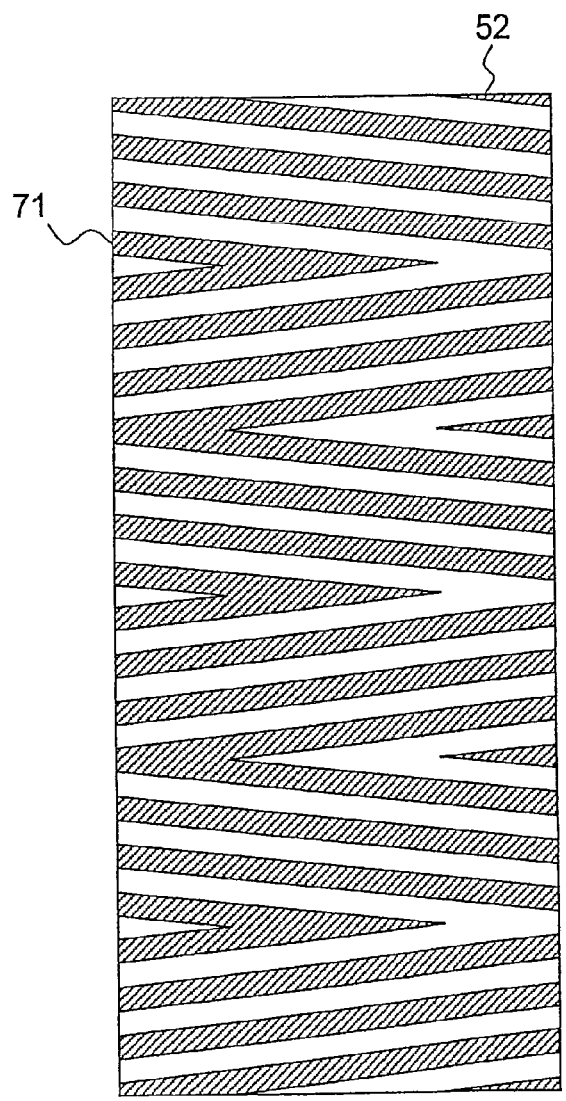
FIG. 12 is a development view of a part of a casing of an agitation mixing apparatus according to a third embodiment of the present invention.

Next, an agitation mixing apparatus 51 according to a third embodiment will be described. In the present embodiment, the grooves 71 formed on the inner wall surface of the casing 52, and the vane 58 are different from those of the first embodiment. Other portions are the same between the present embodiment and the first embodiment. FIG. 12 is a development view of a part of the inner surface of the casing 52. For the convenience of description, the same components as previously shown in FIG. 1 to FIG. 9 for the first embodiment are denoted by the same corresponding reference numerals. Recessed portions of the grooves 71 are represented by diagonal lines.

The agitator 53 has a plurality of helical vanes 58a and a plurality of helical vanes 58b which have twisting directions different from each other as previously shown in FIG. 8, and the grooves 71 are formed in helical shapes having the same twisting directions as the opposing vanes 58a and 58b, respectively. Thus, the grooves 71 are formed at predetermined intervals in the axial direction.

When the agitator 53 is vibrated in the axial direction by the drive source 59 being driven, the fluids-to-be-mixed 60 flow back and forth along the axial direction. In this case, since the fluids-to-be-mixed 60 are moved along the surfaces of the helical vanes 58, the fluids-to-be-mixed 60 flow back and forth along the direction which is almost orthogonal to the surfaces of the vanes 58. Therefore, the flow of the fluids caused by the back and forth flowing becomes substantially orthogonal to the side walls of the grooves 71.

Therefore, the vanes 58a and 58b act such that directions in which the fluids-to-be-mixed 60 are moved are increased in number, and the strong shear occurs in the fluids-to-be-mixed 60, and further the flow of the fluids becomes substantially orthogonal to the side walls of the grooves 71, so that the strength of the shear can be further increased. Thus, the agitating and mixing capability and efficiency can be enhanced as compared to in the first embodiment The intervals for each of the vanes 58a and the vanes 58b are more preferably equal to the intervals for the grooves 71.

Further, similarly to the first embodiment, the width W of each groove 71 is preferably almost equal to the depth D thereof. In addition, the side walls of the grooves 71 are each formed so as to have a radius of curvature which is less than or equal to 1 mm, at the end portion on the open side, thereby increasing enhancement of the agitating and mixing efficiency.

Fourth Embodiment

Figure 13:
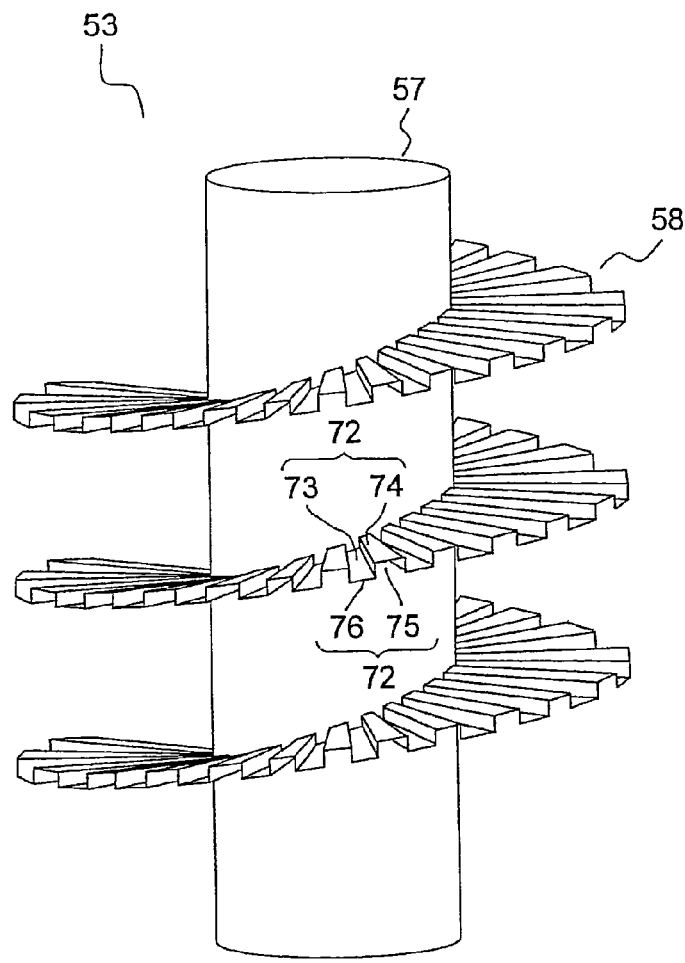
FIG. 13 is a perspective view of a part of an agitator for use in an agitation mixing apparatus according to a fourth embodiment of the present invention.

Next, FIG. 13 is a perspective view of an agitator 53 of an agitation mixing apparatus 51 according to a fourth embodiment. For the convenience of description, the same components as previously shown in FIG. 1 to FIG. 9 for the first embodiment are denoted by the same corresponding reference numerals. In the present embodiment, a helical vane 58 has a recess and projection portion 72. Other portions are the same between the present embodiment and the first embodiment.

The recess and projection portion 72 has recessed portions 73 and 75 and projecting portions 74 and 76 which are radially formed at predetermined angular intervals in a continuous manner. The vane 58 is formed by a component such as a thin-plate-shaped metal or resin being bent, and the recessed portions 73 formed on one surface and the recessed portions 75 formed on the reverse surface thereof share common side walls. Thus, the projecting portions 76 are formed on the reverse side of the recessed portions 73 formed on the one surface, and the projecting portions 74 are formed on the reverse side of the recessed portions 75 formed on the other surface.

Further, the shaft 57 is vibrated in the axial direction by the drive source 59 and the shaft 57 is rotated in a forward and a reverse direction by the drive source 59. Namely, one of the microvibration mode or the reciprocation mode is combined with the forward and reverse rotation mode.

Figure 14:
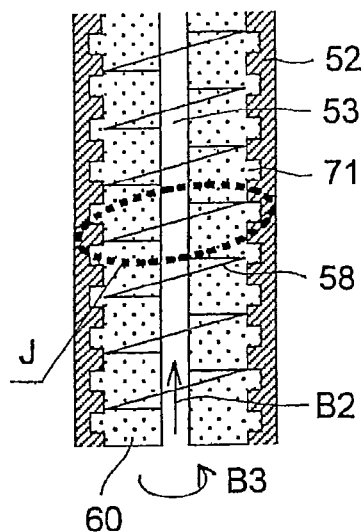
FIG. 14 is a front cross-sectional view illustrating a state in which a drive source is driven in the agitation mixing apparatus according to the fourth embodiment of the present invention.
Figure 15:
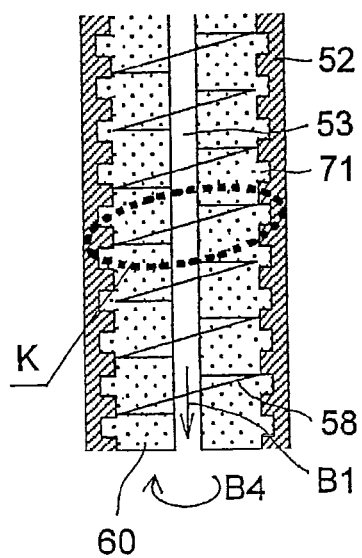
FIG. 15 is a front cross-sectional view illustrating a state in which the drive source is driven in the agitation mixing apparatus according to the fourth embodiment of the present invention.

When the agitation mixing apparatus 51 is operated, the fluids-to-be-mixed 60 flow into the flow path 56 inside the casing 52 through the inlet 54, and the drive source 59 is driven. FIG. 14 and FIG. 15 show states in which the drive source 59 is driven. The agitator 53 is driven by the drive source 59 to vibrate in the axial direction as indicated by arrows B1 and B2, and to rotate in the forward and reverse direction as indicated by arrows B3 and B4. In this case, when the agitator 53 is moved upward (B2), the agitator 53 is rotated (B3) in a direction in which the twist of the vane 58 ascends, whereas when the agitator 53 is moved downward (B1), the agitator 53 is rotated (B4) in a direction in which the twist of the vane 58 descends.

The fluids-to-be-mixed 60 filling the flow path 56 collide with the vane 58 of the agitator 53, and the shear force occurs in the fluids-to-be-mixed 60. Further, the vibration of the agitator 53 in the directions indicated by the arrows B1 and B2 causes generation of the vortexes 21d and 22d in the grooves 71 of the casing 52, in the same manner as described above, so that a great shear force occurs in the fluids-to-be-mixed 60.

Figure 16:
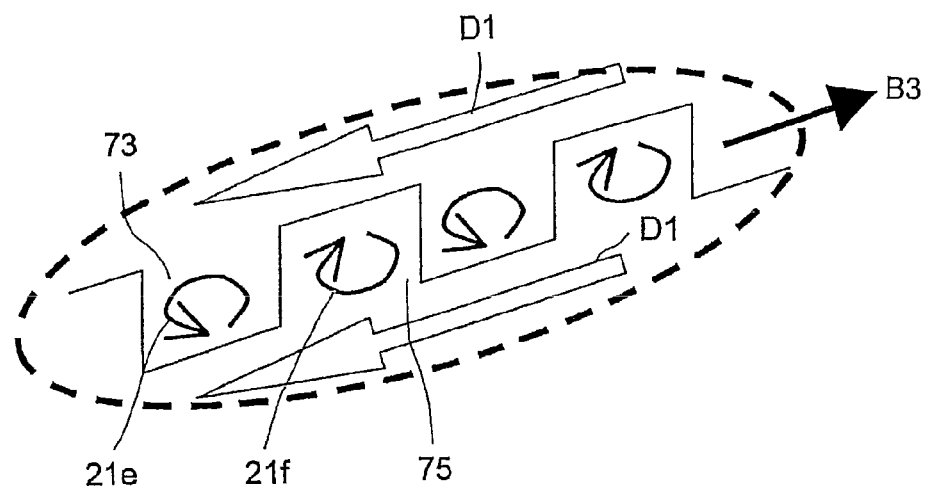
FIG. 16 is a diagram illustrating in detail a portion J shown in FIG. 14.
Figure 17:
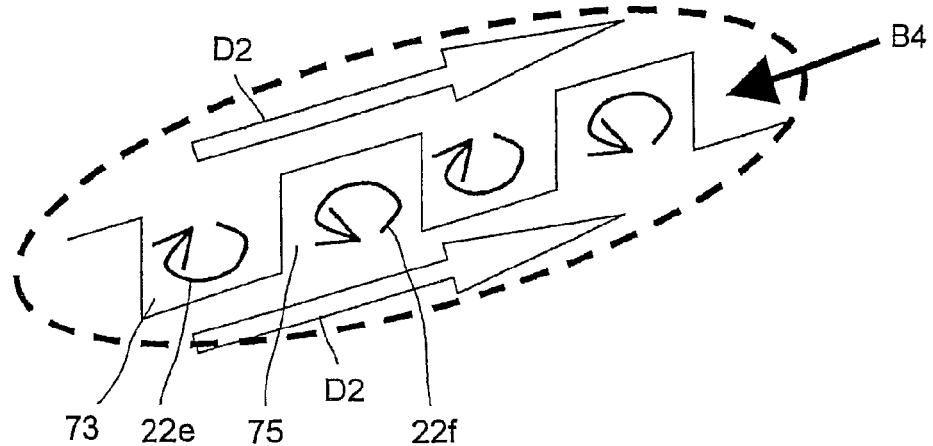
FIG. 17 is a diagram illustrating in detail a portion K shown in FIG. 15.

FIG. 16 and FIG. 17 are diagrams illustrating in detail a portion J shown in FIG. 14, and a portion K shown in FIG. 15, respectively. The vibration and rotation of the agitator 53 cause the fluids-to-be-mixed 60 to move along the vane 58 as indicated by the arrows D1 and D2. As shown in FIG. 16, the fluids-to-be-mixed 60 moving in the direction indicated by the arrow D1 flow into the recessed portions 73 and 75. Thus, vortexes 21e rotating counterclockwise as shown are generated in the recessed portions 73 while vortexes 21f rotating clockwise as shown are generated in the recessed portions 75.

When, immediately after that, the agitator 53 is rotated in the opposite direction, the fluids-to-be-mixed 60 are moved in the direction indicated by the arrow D2, and flow into the recessed portions 73 and 75, as shown in FIG. 17. Thus, vortexes 22e rotating clockwise as shown are generated in the recessed portions 73 while vortexes 22f rotating counterclockwise as shown are generated in the recessed portions 75. Namely, the fluids-to-be-mixed 60 flowing into the recessed portions 73 and 75 act so as to cancel the immediate preceding vortexes 21e and 21f, and break and eliminate the vortexes 21e and 21f, respectively, and the vortexes 22e and 22f rotating in the reverse direction develop in the recessed portions 73 and 75, respectively.

When, immediately after that, the agitator 53 is rotated in the opposite direction, the vortexes 21e and 21f are generated in the recessed portions 73 and 75, respectively, in the same manner as described above. Namely, the fluids-to-be-mixed 60 flowing into the recessed portions 73 and 75 act so as to cancel the immediately preceding vortexes 22e and 22f, and break and eliminate the vortexes 22e and 22f, respectively, and the vortexes 21e and 21f rotating in the reverse direction develop in the recessed portions 73 and 75, respectively. Subsequently, these motions are repeated.

When the vortexes 21e, 22e, 21f, and 22f are broken and eliminated, a great shear force occurs in the fluids-to-be-mixed 60. A plurality of the recessed portions 73 and 75 are formed at predetermined angular intervals, and therefore the great shear force occurring in the fluids-to-be-mixed 60 is enhanced in the recessed portions 73 and 75, to agitate the fluids-to-be-mixed 60. The greater the shear occurring in the fluids-to-be-mixed 60 is, the higher the agitating and mixing capability is. Further, since the generation of the vortexes 21e, 22e, 21f, and 22f is caused by the motion of the fluid which occurs when the agitator 53 is vibrated and rotated, the vortexes 21e, 22e, 21f, and 22f can be generated by using littler power. Therefore, the agitating and mixing efficiency can be also enhanced.

According to the present embodiment, the same effect as obtained in the first embodiment can be obtained. In addition, the recess and projection portion 72 is formed on the surface of the vane 58, so that the disturbance of the flow of the fluids-to-be-mixed 60 is increased, thereby enabling occurrence of a strong shear. Therefore, the agitating and mixing can be performed with enhanced efficiency.

Furthermore, similarly to the first embodiment, the width W of each groove 71 is preferably almost equal to the depth D thereof. In addition, the side walls of the grooves 71 are each formed so as to have a radius of curvature which is less than or equal to 1 mm, at the end portion on the open side, thereby increasing enhancement of the agitating and mixing efficiency. Similarly, the width of each of the recessed portions 73 and 75 is more preferably almost equal to the depth of each of the recessed portions 73 and 75 respectively, and each of side walls of the recessed portions 73 and 75 is still more preferably formed so as to have a radius of curvature which is less than or equal to 1 mm, at the end portion on the open side.

In the present embodiment, the recess and projection portion 72 may be formed similarly on the surface of the vane 58 of the agitator 53 which is previously shown in any of FIG. 7 to FIG. 9.

Further, although the agitator 53 is vibrated in the axial direction, and is rotated about the shaft 57, the agitator 53 may be simply rotated about the shaft 57. Thus, the agitating and mixing can be performed with enhanced efficiency as compared to in a conventional art. Moreover, since the agitator 53 is not vibrated, the vibration and a noise of the agitation mixing apparatus 51 can be substantially reduced. In this case, the grooves 71 may not be provided on the casing 52.

Moreover, the grooves 71 formed in the casing 52 and the vane 58 may be twisted in directions opposite to each other such that the vane 58 and the grooves 71 may be at crossed orientation to each other in an X shape. In this case, when the shaft 57 is rotated alternately in the forward direction and the reverse direction at a high speed, the enhancement of the effect can be increased. Namely, the fluids which are guided by the vane 58 to move upward and downward and the grooves 71 are at crossed orientation to each other, thereby generating strong vortexes in the grooves 71. Thus, strong vortexes are generated in both the recess and projection portion 72 on the surface of the vane 58, and the grooves 71 of the casing 52, thereby increasing the enhancement of the effect. When an angle at which slopes of the vane 58 and slopes of the grooves 71 are at crossed orientation to each other is a right angle, the effect can be maximized.

Fifth Embodiment

Figure 18:
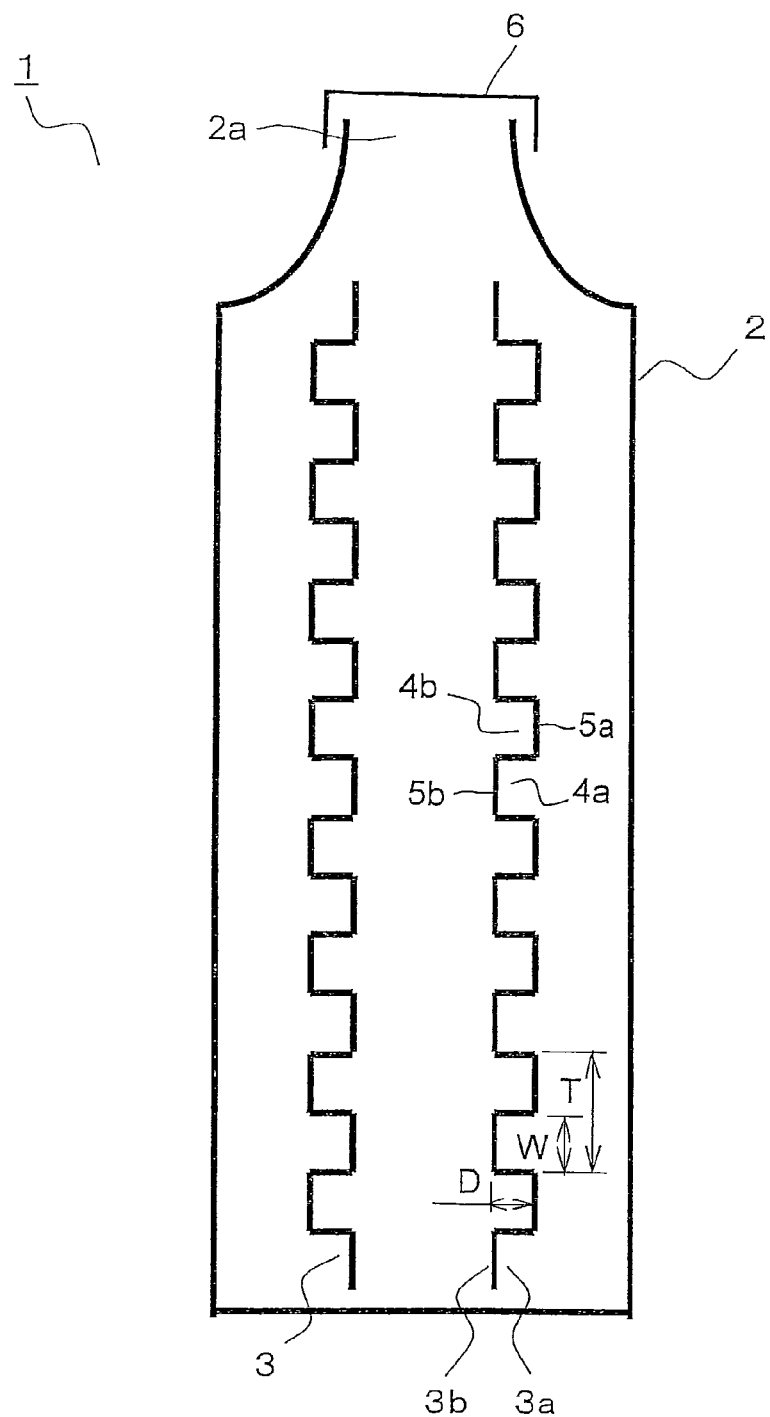
FIG. 18 is a front cross-sectional view of an agitating vessel according to a fifth embodiment of the present invention.

Next, FIG. 18 is a front cross-sectional view of an agitating vessel according to a fifth embodiment. An agitating vessel 1 acts as a package container for a separate liquid dressing 10 (see FIG. 20). The agitating vessel 1 has an outer cylinder 2 of a cylindrical shape which has a closed bottom and has an opening 2a formed at the top thereof. The outer cylinder 2 is formed of a transparent material such as glass or polyethylene terephthalate (PET), so that the inside thereof is visible. The opening 2a is closed by a lid 6 which is detachably screwed onto the outer cylinder 2. The lid 6 is a resin-molded product which is formed of, for example, polypropylene.

Figure 19:
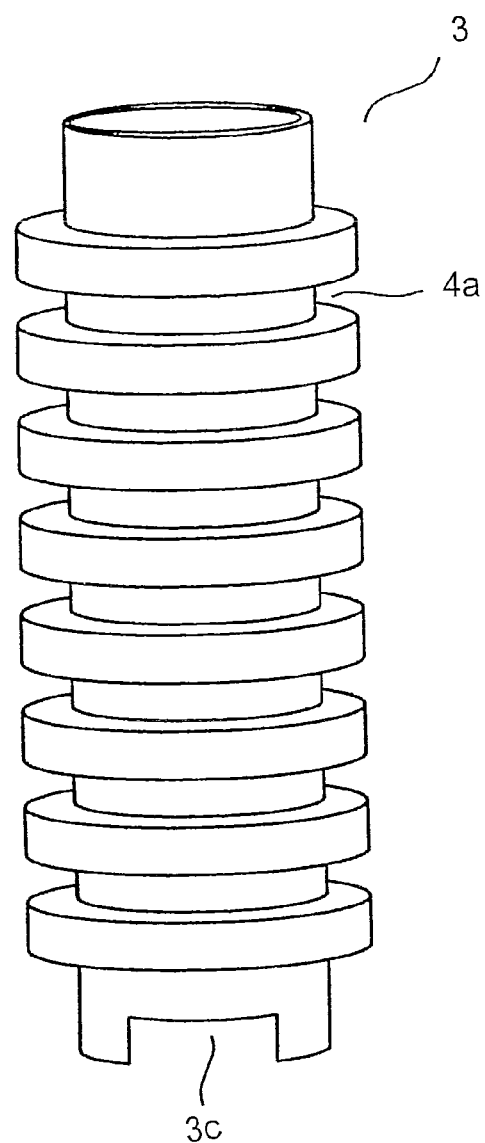
FIG. 19 is a perspective view of an inner cylinder of the agitating vessel according to the fifth embodiment of the present invention.

An inner cylinder 3 having a cylindrical shape is provided inside the outer cylinder 2. FIG. 19 is a perspective view of the inner cylinder 3. The inner cylinder 3 is formed of a transparent resin such as polyethylene terephthalate (PET), so that the inside thereof is visible. A plurality of annular grooves 4a and 4b are aligned at intervals on the outer circumferential surface 3a and the inner circumferential surface 3b, respectively, of the inner cylinder 3 in the axial direction of the inner cylinder 3.

The circumferential wall of the inner cylinder 3 having reduced thickness is bent to form the grooves 4a and the grooves 4b, and the grooves 4a and the grooves 4b share common side walls. Namely, the grooves 4b of the inner circumferential surface 3b are formed on the reverse side of projections 5a between the grooves 4a of the outer circumferential surface 3a while the grooves 4a of the outer circumferential surface 3a are formed on the reverse side of projections 5b between the grooves 4b of the inner circumferential surface 3b. Thus, formation of the grooves 4a and 4b can be facilitated. The grooves 4a and 4b are formed such that the width W of each groove is 5 mm, and the depth D thereof is 5 mm, and the interval T is 10 mm.

The inner cylinder 3 is disposed so as to contact with the bottom of the outer cylinder 2, and a cut portion 3c is formed at the lower end portion of the inner cylinder 3. The cut portion 3c acts as a communication portion for communicating between the outside and the inside of the inner cylinder 3 at the lower portion of the agitating vessel 1. Thus, liquids in the outer cylinder 2 easily flow between the inside and the outside of the inner cylinder 3. Through holes may be formed as the communication portion on the inner cylinder 3. Alternatively, the inner cylinder 3 may be disposed so as to be spaced apart from the bottom of the outer cylinder 2, to form the communication portion below the inner cylinder 3.

Predetermined contents 8 (see FIG. 20) are put into the outer cylinder 2, to obtain the separate liquid dressing 10 (see FIG. 20) which includes the agitating vessel 1 acting as a package container. The contents 8 of the separate liquid dressing 10 include an acid aqueous phase of a liquid containing vinegar as a main component, and an oil phase of a liquid containing an oil as a main component. An acidulant, fresh water, salt, sugars, spices, fruit juices, soy sauce, and/or the like as well as vinegar are added to the liquid of the aqueous phase, as necessary, depending on an application of an intended product. The liquid of the oil phase contains an oil such as a salad oil, and oil-soluble spices may be dissolved, as necessary, into the liquid of the oil phase. The volume ratio of the aqueous phase to the oil phase is 1:9 to 9:1, in general.

If the contents 8 of the separate liquid dressing 10 have been continuously left unused for a certain time period, separation between the aqueous phase and the oil phase occurs. Therefore, when the contents 8 are used, a user shakes the agitating vessel 1 to mix and agitate the contents 8. Thus, the two phases of the contents 8 are dispersed to form a dispersed liquid, and the dispersed liquid is added to food or the like.

Figure 20:
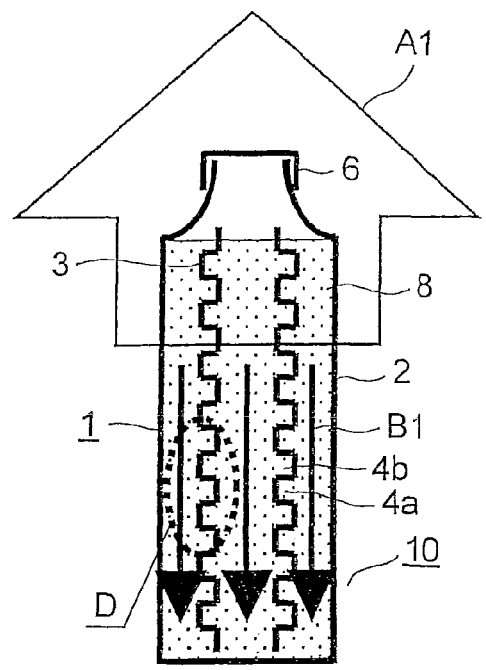
FIG. 20 is a diagram illustrating a state in which a separate liquid dressing is shaken by using the agitating vessel according to the fifth embodiment of the present invention.
Figure 21:
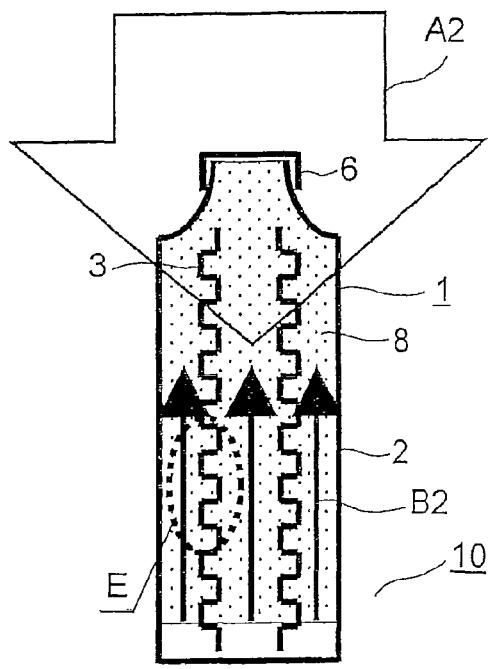
FIG. 21 is a diagram illustrating a state in which the separate liquid dressing is shaken by using the agitating vessel according to the fifth embodiment of the present invention.

FIG. 20 and FIG. 21 are diagrams illustrating states in which the separate liquid dressing 10 is shaken. When the separate liquid dressing 10 is shaken in the longitudinal direction, a period in which the separate liquid dressing 10 is moved upward and a period in which the separate liquid dressing 10 is moved downward are alternately repeated. When the separate liquid dressing 10 is moved upward as indicated by an arrow A1, the contents 8 are moved downward as indicated by an arrow B1 due to the inertial force. On the other hand, when the separate liquid dressing 10 is moved downward as indicated by an arrow A2, the contents 8 are moved upward as indicated by an arrow B2.

Figure 22:
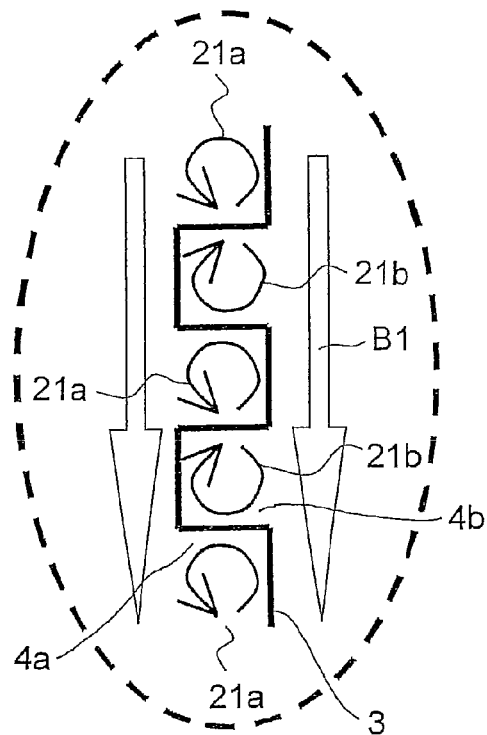
FIG. 22 is a diagram illustrating in detail a portion D shown in FIG. 20.
Figure 23:
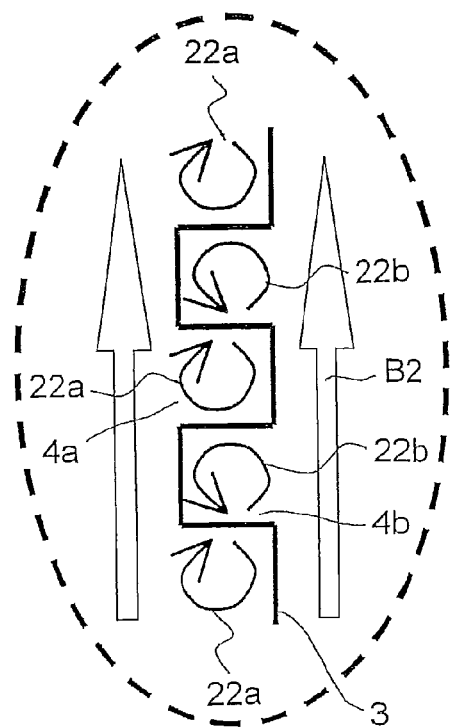
FIG. 23 is a diagram illustrating in detail a portion E shown in FIG. 21.
Figure 24:
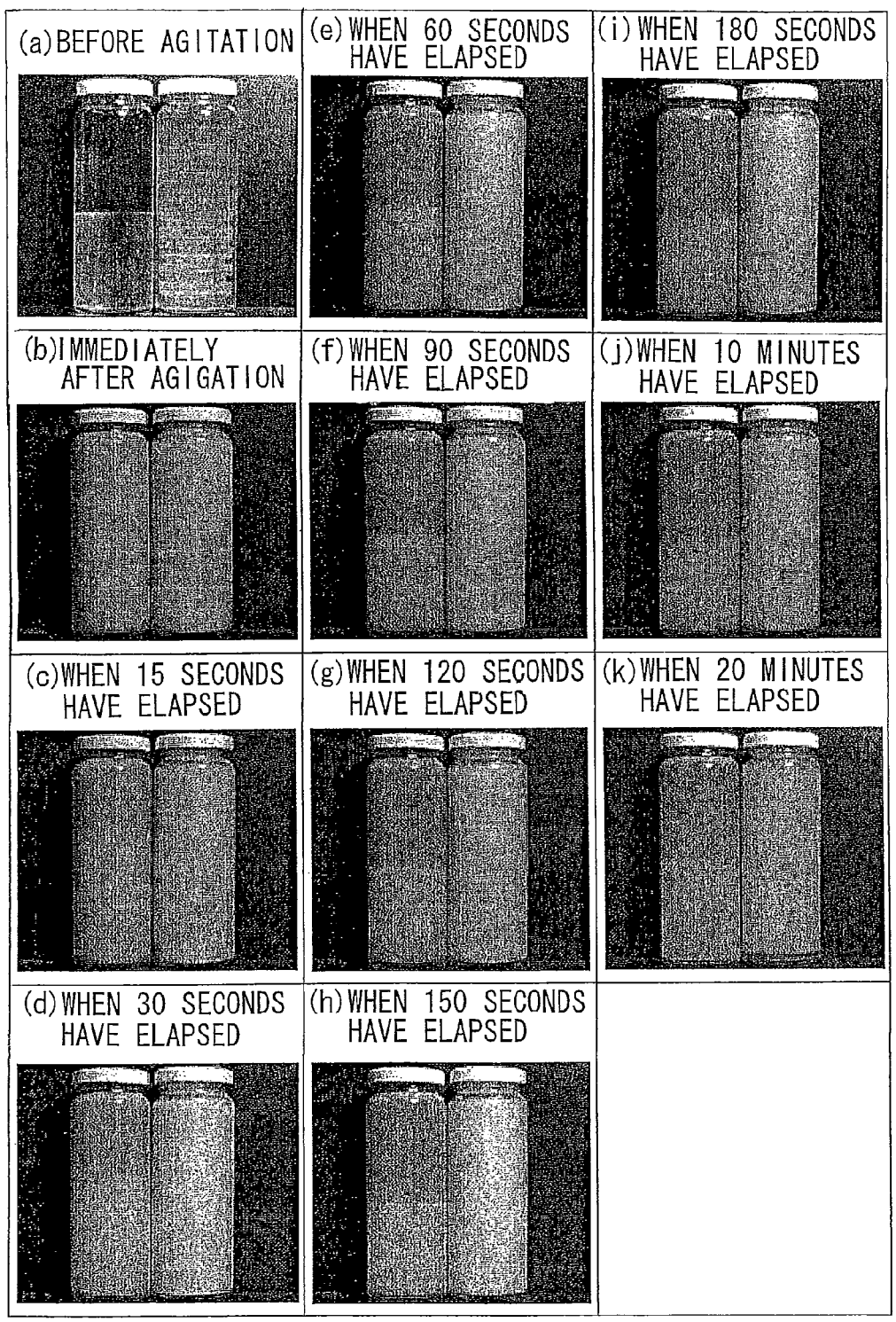
FIG. 24 is a diagram illustrating a result of an experiment for dispersion performed by agitation using the agitating vessel according to the fifth embodiment of the present invention.

FIG. 22 and FIG. 23 are diagrams illustrating in detail a portion D shown in FIG. 20 and a portion E shown in FIG. 21, respectively. When the contents 8 are moved in the direction indicated by the arrow B1, liquids flowing along the outer circumferential surface 3a and the inner circumferential surface 3b of the inner cylinder 3 flow into the grooves 4a and 4b, respectively, as shown in FIG. 22. Thus, vortexes 21a rotating counterclockwise as shown are generated in the grooves 4a whereas vortexes 21b rotating clockwise as shown are generated in the grooves 4b.

When, immediately after that, the contents 8 are moved in the direction indicated by the arrow B2, vortexes 22a rotating clockwise as shown are generated in the grooves 4a as shown in FIG. 23. Further, vortexes 22b rotating counterclockwise as shown are generated in the grooves 4b. Namely, the liquids flowing into the grooves 4a act so as to cancel the immediately preceding vortexes 21a, and break and eliminate the vortexes 21a, and the vortexes 22a which rotate in the reverse direction develop in the grooves 4a. Similarly, the liquids flowing into the grooves 4b act so as to cancel the immediately preceding vortexes 21b, and break and eliminate the vortexes 21b, and the vortexes 22b which rotate in the reverse direction develop in the grooves 4b.

When, immediately after that, the contents 8 are moved in the direction indicated by the arrow B1, the vortexes 21a and 21b are generated in the grooves 4a and 4b, respectively, in the same manner as described above. Namely, the liquids flowing into the grooves 4a act so as to cancel the immediately preceding vortexes 22a, and break and eliminate the vortexes 22a, and the vortexes 21a which rotate in the reverse direction develop in the grooves 4a. Similarly, the liquids flowing into the grooves 4b act so as to cancel the immediately preceding vortexes 22b, and break and eliminate the vortexes 22b, and the vortexes 21b which rotate in the reverse direction develop in the grooves 4b. Subsequently, theses motions are repeated.

When the vortexes 21a, 21b, 22a, and 22b are broken and eliminated, a great shear force occurs in the liquids. A plurality of the grooves 4a and a plurality of the grooves 4b are provided, and therefore the great shear force occurs in the liquids in the grooves 4a and 4b, and the liquids are agitated. Therefore, even when a force with which the separate liquid dressing 10 is shaken is small, and/or even when the number of times the separate liquid dressing 10 is shaken is small, the aqueous phase and the oil phase are very highly dispersed, thereby producing a dispersed liquid, which is approximate to an emulsion.

FIGS. 24(a) to 24(k) are diagrams illustrating a result of an experiment for indicating, in a visible manner, an effect of the dispersion which is obtained by liquids being agitated in the agitating vessel 1. In each of FIGS. 24(a) to 24(k), the agitating vessel 1 of the present embodiment is located on the right side, and an agitating vessel which does not include the inner cylinder 3 is located on the left side for comparison. A liquid in the agitating vessel 1 contains a tap water as the aqueous phase and a commercially-available olive oil as the oil phase, and the volume ratio of the aqueous phase to the oil phase is set as 1:1.

FIG. 24(a) shows a state in which the liquid has not been agitated. FIG. 24(b) shows a state observed immediately after the agitating vessel 1 has been shaken ten times, to agitate the liquids under a condition that the amplitude in the axial direction is 10 cm. FIGS. 24(c) to 24(k) show states observed when 15 seconds have elapsed, 30 seconds have elapsed, 60 seconds have elapsed, 90 seconds have elapsed, 120 seconds have elapsed, 150 seconds have elapsed, 180 seconds have elapsed, 10 minutes have elapsed, and 20 minutes have elapsed, respectively, after the liquid has been agitated in the agitating vessel 1.

Immediately after the liquids have been agitated in the agitating vessel 1, the liquids are in dispersed states in both the present embodiment and a comparative example. In the comparative example, when 15 seconds elapsed after the agitation, separation between the aqueous phase and the oil phase started, and when 180 seconds elapsed, the liquids were almost completely separated into the two phases. On the other hand, in the agitating vessel 1 of the present embodiment, even when 20 minutes elapsed after the agitation, separation between the aqueous phase and the oil phase did not start. Namely, a time period for return to the original state from turbidity was significantly increased in the present embodiment.

Further, diameters of particles contained in the liquid were checked. The diameters of the particles were significantly small in the present embodiment whereas the diameters of the particles were relatively large in the comparative example. Although the agitating was further performed in the agitating vessel 1 of the comparative example for a time period which was three times or more longer than the time period as described above, the diameters of the particles in the liquid were not reduced, and little increase in the time period for return to the original state from turbidity was observed.

From the results described above, it can be understood that the shear force occurring in the liquids contained in the agitating vessel 1 of the present embodiment is significantly increased, and the mixture and agitation can be strengthened. Thus, a dispersed liquid which is creamy and approximate to an emulsion can be easily produced.

According to the present embodiment, the grooves 4a and 4b are aligned on the outer circumferential surface 3a and the inner circumferential surface 3b, respectively, of the inner cylinder 3 at intervals of T in the axial direction. Therefore, when the agitating vessel 1 is shaken in the axial direction, the vortexes 21a and 21b are generated in the grooves 4a and 4b, respectively. Therefore, the immediately preceding vortexes 22a and 22b rotating in the reverse directions are broken, and a great shear force occurs in the liquids. Therefore, even when the shaking force and/or the number of times of the shaking are reduced, the contents 8 of the separate liquid dressing 10 can be sufficiently dispersed. As a result, even for a user having a low strength, such as women, children, and elderly persons, the agitating can be easily performed.

The interval T may not be regular. Further, also when either the grooves 4a of the outer circumferential surface 3a or the grooves 4b of the inner circumferential surface 3b are not provided on the inner cylinder 3, a great shear force may occur in the contents 8 and the contents 8 can be sufficiently dispersed. When both the grooves 4a of the outer circumferential surface 3a and the grooves 4b of the inner circumferential surface 3b are provided on the inner cylinder 3, the number of generated vortexes is increased, thereby enhancing the dispersion of the contents 8.

Moreover, since the circumferential wall of the inner cylinder 3 is bent to form the grooves 4a and 4b on the outer circumferential surface and the inner circumferential surface, respectively, of the inner cylinder 3, and the grooves 4b on the inner circumference side and the grooves 4a on the outer circumference side share common side walls, the grooves 4a and 4b can be easily formed, by using a resin-molded product having a reduced thickness, on the both sides, respectively, of the inner cylinder 3. Thus, the internal volume of the outer cylinder 2 can be increased.

Further, the cut portion 3c (the communication portion) for communicating between the inside and the outside of the inner cylinder 3 is provided at the lower portion, and therefore liquids which are inside and outside the inner cylinder 3, and solid materials contained in the liquids flow between the inside and the outside of the inner cylinder 3 through the communication portion. When no communication portion is provided, the shear force occurring in liquids inside the inner cylinder 3 is different from the shear force occurring in liquids outside the inner cylinder 3, and the dispersion degrees of the inside liquids and the outside liquids may be different from each other. When the communication portion is provided, substances inside and outside the inner cylinder 3 flow between the inside and the outside of the inner cylinder 3, thereby averaging the dispersion degrees thereof. Accordingly, a dispersed liquid can be more creamy.

Moreover, in the present embodiment, the grooves 4a and 4b are formed such that the width W and the depth D of each groove are each 5 mm. When the depth D of each groove of the grooves 4a and 4b is significantly smaller or greater than the width W thereof, vortexes are not likely to be generated in the grooves 4a and 4b. Therefore, the shear force occurring in the liquids is significantly reduced, resulting in insufficient dispersion. Therefore, the width W and the depth D of each groove of the grooves 4a and 4b are preferably almost equal to each other. In this case, when the interval T for the grooves 4a and 4b is twice the width W, the grooves 4a and 4b can be positioned with maximized efficiency.

The width W and the depth D of each groove of the grooves 4a and 4b are determined as appropriate lengths in accordance with the viscosity of the contents 8. Specifically, when the viscosity of the contents is relatively low, it is preferable that the width W and the depth D of each groove of the grooves 4a and 4b are relatively small. When the viscosity of the contents is relatively high, it is preferable that the width W and the depth D of each groove of the grooves 4a and 4b are relatively great.

In the present embodiment, the contents 8 contain vinegar and oil, and the width W of each groove of the grooves 4a and 4b is 5 mm, thereby enabling sufficient dispersion. Therefore, when the width W of each groove of the grooves 4a and 4b is greater than or equal to 5 mm, the contents containing a water soluble liquid and an oil can be sufficiently dispersed.

For example, when the contents 8 contain a solid material such as ground sesame and/or ground onion, the grooves 4a and 4b are clogged with the solid material, thereby preventing generation of the vortexes 21a, 21b, 22a, and 22b. Therefore, the width W of each groove of the grooves 4a and 4b needs to be at least about twice to three times as large as the size of the solid material. However, when the width W of each groove of the grooves 4a and 4b is unnecessarily increased, the number of the grooves 4a and 4b formed in the inner cylinder 3 is reduced. Therefore, the number of the vortexes 21a, 21b, 22a, and 22b generated is also reduced, thereby reducing the shear force. Therefore, when the solid material is contained in the separate liquid dressing 10 or the like, the width W of each groove of the grooves 4a and 4b needs to be minimized in a range within which the grooves 4a and 4b are not clogged with the solid material.

Moreover, when the contents 8 contain no solid material, the depth D and the width W of each groove of the grooves 4a and 4b may be less than or equal to 5 mm. When the width of the flow path in which the fluid is moved upward and downward, the depth of each groove of the grooves 4a and 4b, and the width W of each groove of the grooves 4a and 4b are almost equal to each other, the efficiency can be maximized. When the width of the flow path is excessively great, a proportion of a region in which the shear force occurs in fluid with respect to the entirety is reduced, so that the shear force may not efficiently occur. Therefore, when the width of the flow path is excessively great, the inner cylinder needs to be multilayered by using, for example, two or three inner cylinders as necessary, such that the width (clearance between the projections) of the flow path, the depth of each groove, and the width of each groove are adjusted so as to be almost equal to each other.

For a package container for the separate liquid dressing 10, when the depth D and the width W of each groove of the grooves 4a and 4b are each about 5 mm, a preferable effect can be obtained, and when the depth D and the width W thereof are each less than about 10 mm, a sufficient effect can be obtained. When the depth D and the width W thereof are each greater than or equal to 10 mm, the number of each of the grooves 4a and 4b is reduced, and it is not preferable. These are results for a case where the agitating vessel for the separate liquid dressing 10 has a circular cross-section having the diameter of 60 mm. In this case, a clearance between the inner circumferential surface of the outer cylinder 2 and the projection 5a of the outer circumferential surface 3a of the inner cylinder 3 is 10 mm, and the depth of each groove of the grooves 4a and 4b is 10 mm, and a distance between the projection 5b of the inner circumferential surface 3b of the inner cylinder 3 and the center of the inner cylinder 3 is 10 mm, and this disposition can maximize the efficiency.

Specifically, when a representative length of the cross section of the outer cylinder 2 is represented as L, the width W of each groove of the grooves 4a and 4b, the depth D of each groove of the grooves 4a and 4b, and the distance between the inner circumferential surface of the outer cylinder 2 and the projection 5a of the outer circumferential surface 3a of the inner cylinder 3 are each set as about L/6, the disposition is efficient. When the cross section is circular, the representative length L is the diameter, and when the cross section is rectangular, the representative length L is the length of one side. Further, when these are set so as to be greater than or equal to about L/8, the efficiency is high.

Further, when the width W of each groove of the grooves 4a and 4b is greater than L/2, the width W and the depth D of each groove of the grooves 4a and 4b cannot become almost equal to each other. Therefore, the vortexes 21a, 21b, 22a, and 22b are generated in the grooves 4a and 4b so as to have elliptical shapes, thereby reducing the efficiency for generating the vortexes or reducing the strength of the vortexes. Further, the number of each of the grooves 4a and 4b formed in the inner cylinder 3 is reduced, and the number of generated vortexes is also reduced, which in turn causes the reduction of the shear force. Therefore, the width W of each groove of the grooves 4a and 4b is preferably greater than or equal to L/8, and is not greater than L/2.

Moreover, the side walls of each groove of the grooves 4a and 4b may form a V-shaped or an arch-shaped cross section by the side walls being inclined. However, as in the present embodiment, it is more preferable that the side walls of each groove of the grooves 4a and 4b form a rectangular cross-section which is orthogonal to the axial direction. Namely, since the side walls of the grooves 4a and 4b are orthogonal to the axial direction, the flow of the liquids caused by the upward and downward movement of the contents 8 along the axial direction is orthogonal to the side walls of the grooves 4a and 4b. Thus, the flow of the liquids is efficiently separated at the side walls of the grooves 4a and 4b, and the fluids efficiently flow into the grooves 4a and 4b. Therefore, the strong vortexes can be efficiently generated in the grooves 4a and 4b. The greater the strength of the generated vortexes is, the greater the shear occurring in the liquids is, thereby enhancing the dispersion of the contents 8.

Further, when the side walls of the grooves 4a and 4b are each formed so as to have a great radius of curvature at the end portion on the open side, the liquids smoothly flow into the grooves 4a and 4b, which prevents generation of strong vortexes. Therefore, the side walls of the grooves 4a and 4b are each formed so as to have a radius of curvature which is less than or equal to 1 mm, at the end portion on the open side. Thus, the flow of the liquids is separated with enhanced efficiency, so that strong vortexes can be generated, thereby enhancing the dispersion of the contents 8.

The outer cylinder 2 is formed of a transparent material such as glass or polyethylene terephthalate (PET), and therefore a state in which the contents 8 are agitated can be easily confirmed. The inner cylinder 3 is formed of a transparent resin such as polyethylene terephthalate (PET), and therefore a state in which the contents 8 are agitated can be confirmed in more detail. At least a part of each of the outer cylinder 2 and the inner cylinder 3 may be transparent. When there is no influence on the contents 8, polyethylene (PE), polypropylene (PP), or the like, which can be easily molded, may be used. Further, when it is unnecessary to confirm the agitated state, a ceramic material such as earthenware and porcelain, or a metal material may be used.

Although the grooves 4a and 4b are each formed so as to be annular, the grooves 4a and 4b may be formed so as to have a helical shape if the grooves 4a and 4b are aligned at predetermined intervals in the axial direction of the inner cylinder 3.

Sixth Embodiment

Figure 25:
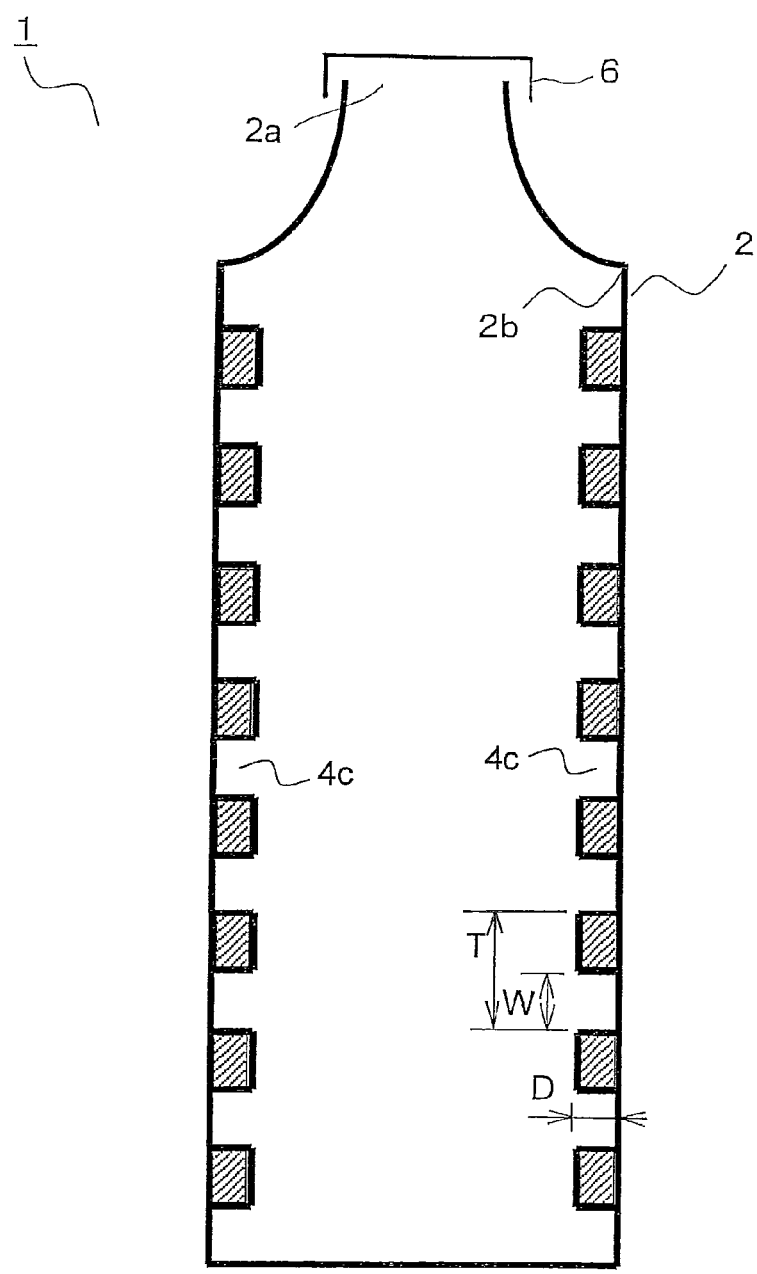
FIG. 25 is a front cross-sectional view of an agitating vessel according to a sixth embodiment of the present invention.

Next, FIG. 25 is a side cross-sectional view of an agitating vessel according to a sixth embodiment. For the convenience of description, the same components as previously shown in FIG. 18 to FIG. 24 for the fifth embodiment are denoted by the same corresponding reference numerals. In the present embodiment, the inner cylinder 3 is eliminated from the fifth embodiment, and a plurality of annular grooves 4c are aligned on the inner circumferential surface 2b of the outer cylinder 2 at predetermined intervals in the axial direction. Other portions are the same between the present embodiment and the fifth embodiment.

The outer cylinder 2 is formed of a transparent resin such as polyethylene terephthalate (PET). Thus, an agitated state can be easily observed. When there is no influence on the contents 8 (see FIG. 26), polyethylene (PE), polypropylene (PP), or the like may be used. When it is unnecessary to observe the inside, the outer cylinder 2 may be formed of an opaque material. The grooves 4c are formed simultaneously when the outer cylinder 2 is formed, and the grooves 4c are formed such that the width W of each groove is 5 mm, the depth D thereof is 5 mm, and the interval T is 10 mm.

The contents 8 (see FIG. 26) which are the same as that for the fifth embodiment are put into the outer cylinder 2, to obtain the separate liquid dressing 10 (see FIG. 26) which includes the agitating vessel 1 acting as a package container.

Figure 26:
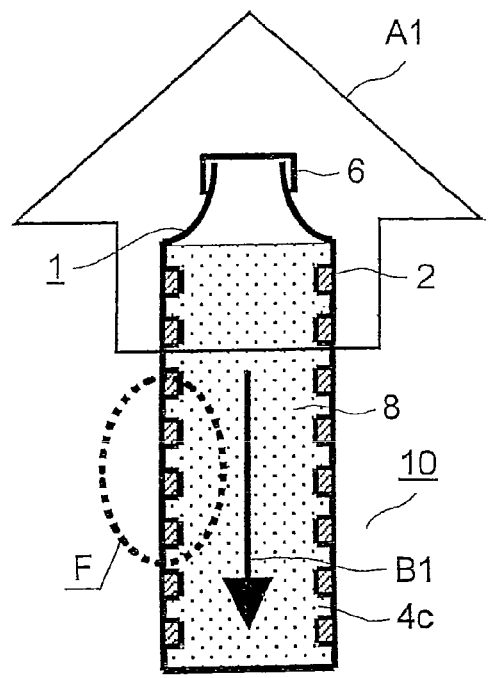
FIG. 26 is a diagram illustrating a state in which a separate liquid dressing is shaken by using the agitating vessel according to the sixth embodiment of the present invention.
Figure 27:
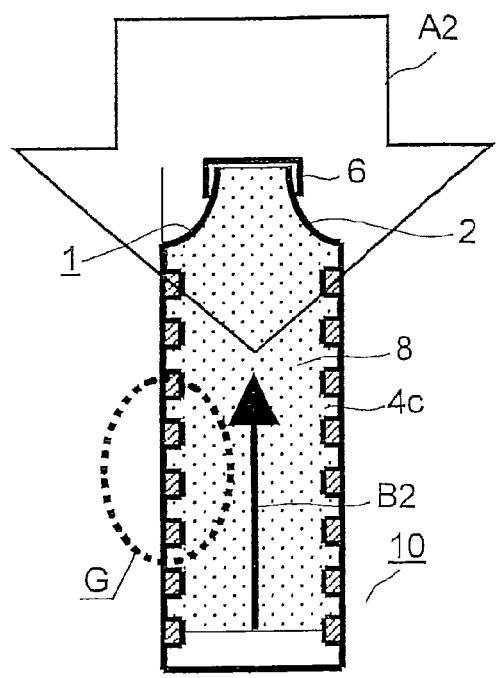
FIG. 27 is a diagram illustrating a state in which the separate liquid dressing is shaken by using the agitating vessel according to the sixth embodiment of the present invention.

FIG. 26 and FIG. 27 are diagrams illustrating states in which the separate liquid dressing 10 is shaken. When the separate liquid dressing 10 is shaken in the longitudinal direction, a period in which the separate liquid dressing 10 is moved upward and a period in which the separate liquid dressing 10 is moved downward are alternately repeated. When the separate liquid dressing 10 is moved upward as indicated by an arrow A1, the contents 8 are moved downward as indicated by an arrow B1 due to the inertial force. Further, when the separate liquid dressing 10 is moved downward as indicated by an arrow A2, the contents 8 are moved upward as indicated by an arrow B2.

Figure 28:
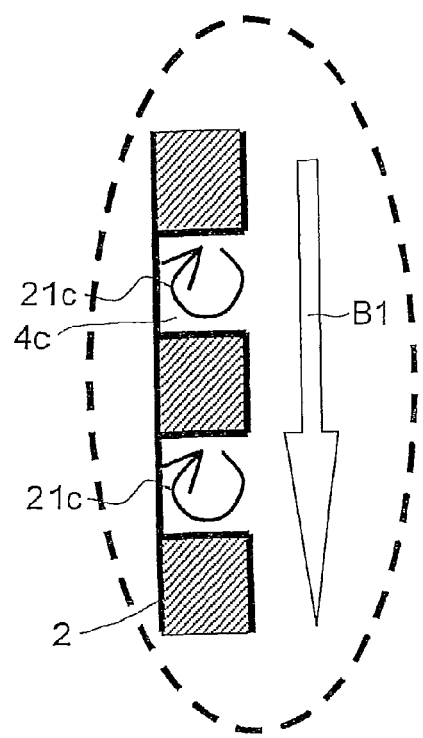
FIG. 28 is a diagram illustrating in detail a portion F shown in FIG. 26.
Figure 29:
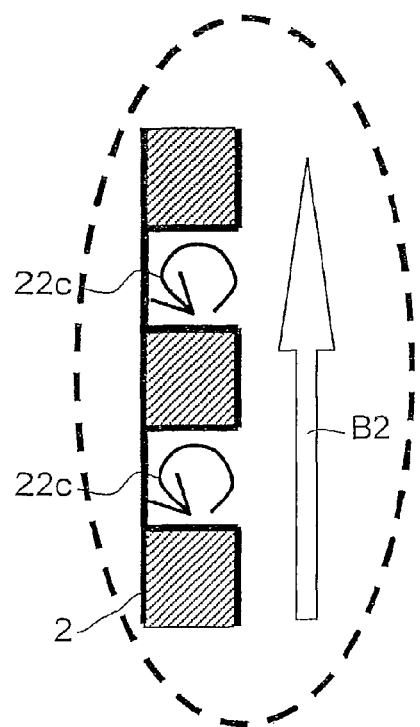
FIG. 29 is a diagram illustrating in detail a portion G shown in FIG. 27.

FIG. 28 and FIG. 29 are diagrams illustrating in detail a portion F shown in FIG. 26, and a portion G shown in FIG. 27, respectively. When the contents 8 are moved in the direction indicated by the arrow B1, liquids flowing along the inner circumferential surface 2b of the outer cylinder 2 flow into the grooves 4c as shown in FIG. 28. Thus, vortexes 21c rotating clockwise as shown are generated in the grooves 4c.

When, immediately after that, the contents 8 are moved in the direction indicated by the arrow B2, vortexes 22c rotating counterclockwise as shown are generated in the grooves 4c as shown in FIG. 29. That is, liquids flowing into the grooves 4c act so as to cancel the immediately preceding vortexes 21c, and break and eliminate the vortexes 21c, and the vortexes 22c rotating in the reverse direction develop in the grooves 4c.

When, immediately after that, the contents 8 are moved in the direction indicated by the arrow B1, the vortexes 21c are generated in the grooves 4c in the same manner as described above. That is, liquids flowing into the grooves 4c act so as to cancel the immediately preceding vortexes 22c, and break and eliminate the vortexes 22c, and the vortexes 21c rotating in the reverse direction develop in the grooves 4c. Subsequently, these motions are repeated.

When the vortexes 21c and 22c are broken and eliminated, a great shear force occurs in the liquids. A plurality of the grooves 4c are provided, and therefore a great shear force occurs in the liquids in the grooves 4c, thereby agitating the liquids. Therefore, even when a force with which the separate liquid dressing 10 is shaken, and/or the number of times the separate liquid dressing 10 is shaken are reduced, the aqueous phase and the oil phase are dispersed in a considerably minute manner, thereby producing a dispersed liquid, which is approximate to an emulsion.

According to the present embodiment, since the grooves 4c are aligned on the inner circumferential surface 2b of the outer cylinder 2 at intervals T in the axial direction, the vortexes 21c are generated in the grooves 4c by the agitating vessel 1 being shaken in the axial direction. Therefore, the immediately preceding vortexes 22c, which rotate in the reverse direction, are broken, and a great shear force occurs in the liquids. Therefore, even when the force for the shaking and/or the number of times of the shaking are reduced, the contents 8 of the separate liquid dressing 10 can be sufficiently dispersed. As a result, even for a user having a low strength, such as women, children, and elderly persons, the agitating can be easily performed.

Further, when the width W and the depth D of each groove of the grooves 4c are almost equal to each other, the dispersion of the contents 8 can be enhanced. When the representative length of the outer cylinder 2 is represented as L, and the width W of each groove of the grooves 4c is greater than or equal to L/8, and is not greater than L/2, dispersion of contents containing a water soluble liquid and an oil can be enhanced. Further, when the side walls of the grooves 4c are each formed so as to have a rectangular cross section which is orthogonal to the axial direction, the strengths of the generated vortexes are increased, thereby enhancing the dispersion of the contents 8. In addition, the side walls of the grooves 4c are each formed so as to have a radius of curvature which is less than or equal to 1 mm, at the end portion on the open side, and therefore the dispersion of the contents 8 can be enhanced.

The grooves 4c are each formed so as to be annular. However, the grooves 4c may be formed so as to have a helical shape if the grooves 4c are aligned at predetermined intervals in the axial direction of the outer cylinder 2. Further, the interval T may not be regular.

Seventh Embodiment

Figure 30:
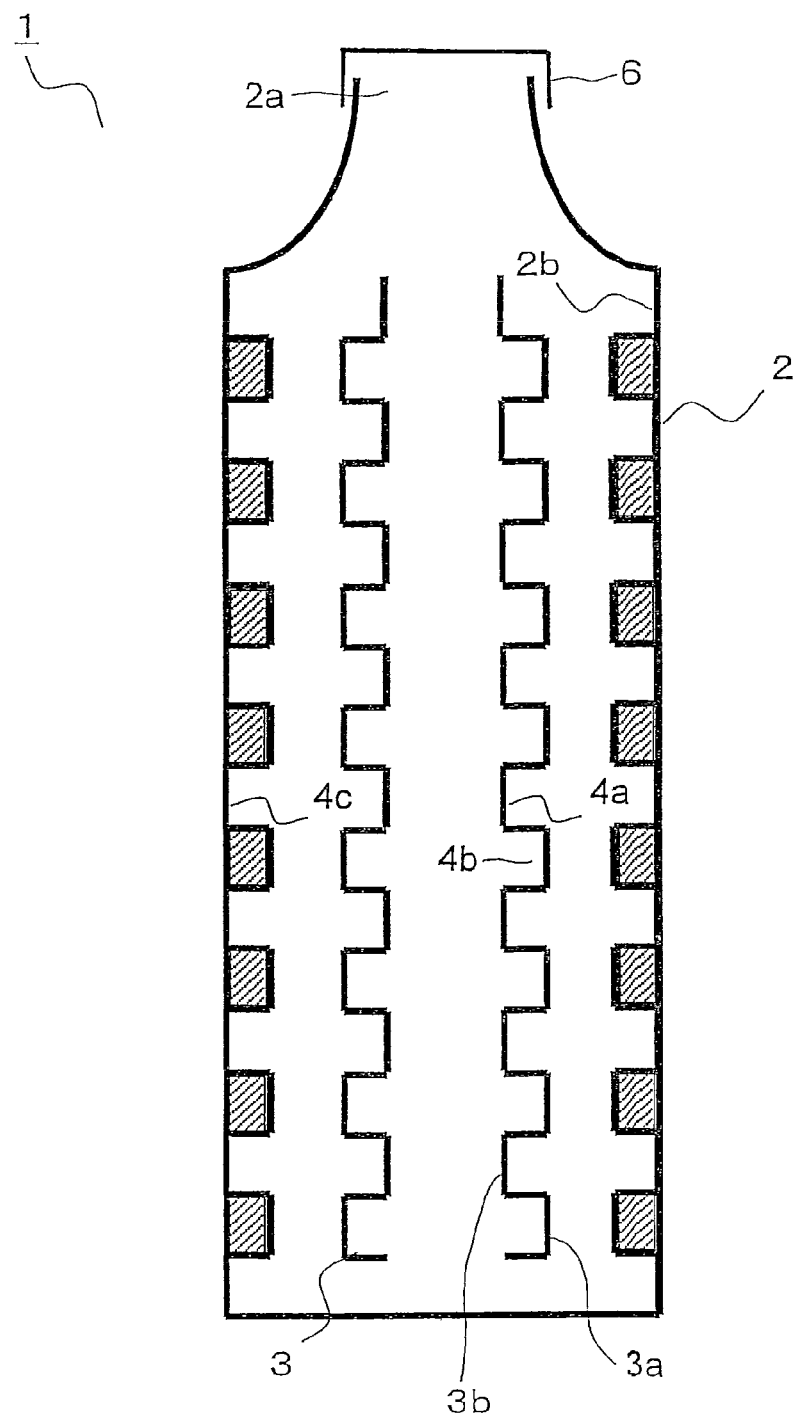
FIG. 30 is a front cross-sectional view of an agitating vessel according to a seventh embodiment of the present invention.

Next, FIG. 30 is a side cross-sectional view of an agitating vessel according to a seventh embodiment. For the convenience of description, the same components as previously shown in FIG. 18 to FIG. 29 for the fifth and the sixth embodiments are denoted by the same corresponding reference numerals. In the present embodiment, the same inner cylinder 3 as described in the fifth embodiment is provided, and the same grooves 4c as described in the sixth embodiment are provided. Other portions are the same between the present embodiment and the fifth embodiment.

According to the present embodiment, the grooves 4a and 4b are formed on the outer circumferential surface 3a and the inner circumferential surface 3b, respectively, of the inner cylinder 3, and the grooves 4c are formed on the inner circumferential surface 2b of the outer cylinder 2. Therefore, the number of the grooves can be increased as compared to in the fifth and the sixth embodiments, so that the number of vortexes which are generated in the grooves is increased, thereby increasing the shear force occurring in liquids. Therefore, even when the shaking force and/or the number of times of the shaking are reduced, the contents 8 of the separate liquid dressing 10 can be sufficiently dispersed.

Further, the grooves 4a of the outer circumferential surface 3a of the inner cylinder 3 are positioned so as to be opposed to the grooves 4c of the inner circumferential surface 2b of the outer cylinder 2. When the projections 5a (see FIG. 18) of the outer circumferential surface 3a of the inner cylinder 3 are opposed to the grooves 4c, liquids flowing between the outer cylinder 2 and the inner cylinder 3 meander through the grooves 4a and the grooves 4c, so that vortexes are not likely to be generated. Therefore, the grooves 4a and the grooves 4c are positioned so as to be opposed to each other, thereby enabling strong vortexes to be generated.

Eighth Embodiment

Figure 31:
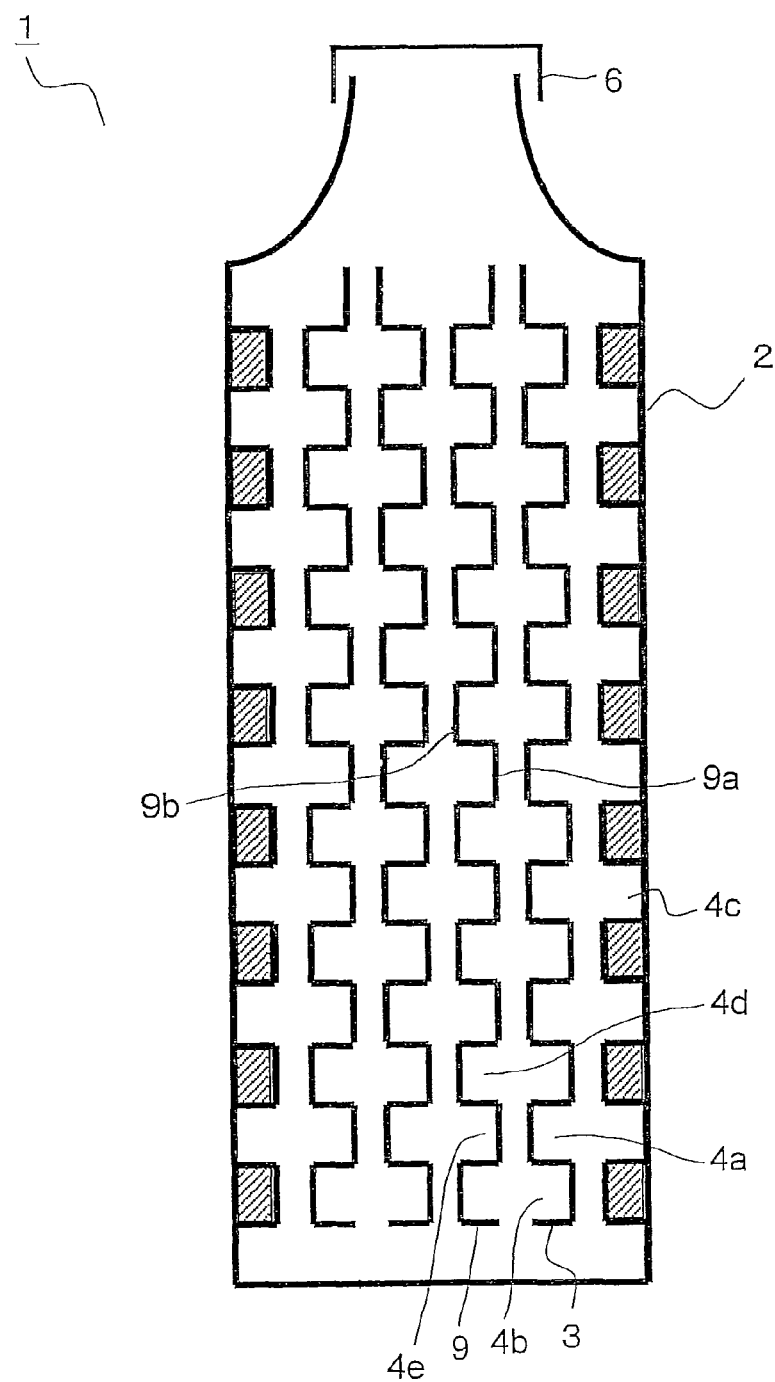
FIG. 31 is a front cross-sectional view of an agitating vessel according to an eighth embodiment of the present invention.

Next, FIG. 31 is a side cross-sectional view of an agitating vessel according to an eighth embodiment. For the convenience of description, the same components as previously shown in FIG. 18 to FIG. 30 for the fifth to the seventh embodiments are denoted by the same corresponding reference numerals. In the present embodiment, in addition to the components of the seventh embodiment, an inner cylinder 9 is further provided inside the inner cylinder 3. Other portions are the same between the present embodiment and the seventh embodiment.

The inner cylinder 9 has an inner diameter smaller than the inner cylinder 3, and grooves 4d and 4e, which are similar to the grooves provided on the inner cylinder 3, are provided on the outer circumferential surface 9a and the inner circumferential surface 9b, respectively. At the lower end of the inner cylinder 9, a cut portion (not shown) is provided which is similar to the cut portion 3c (see FIG. 19) of the inner cylinder 3.

According to the present embodiment, the number of the grooves can be increased as compared to in the seventh embodiment, and the number of vortexes which are generated in the grooves is also increased, thereby enhancing a great shear force occurring in liquids. Therefore, even when the shaking force and/or the number of times of the shaking are reduced, the contents 8 of the separate liquid dressing 10 can be sufficiently dispersed.

Further, the grooves 4b of the inner circumferential surface 3b of the inner cylinder 3 are positioned so as to be opposed to the grooves 4d of the outer circumferential surface 9a of the inner cylinder 9. When the projections 5b (see FIG. 18) of the inner circumferential surface 3b of the inner cylinder 3 are opposed to the grooves 4d, liquids flowing between the inner cylinder 3 and the inner cylinder 9 meander through the grooves 4b and 4d, so that the vortexes are not likely to be generated. Therefore, the grooves 4b and 4d are positioned so as to be opposed to each other, thereby enabling strong vortexes to be generated.

When the viscosity of the contents 8 is relatively high, fluidity is reduced, so that a shear force occurring in liquids may be reduced. Therefore, contents having a relatively low viscosity should be selected.

According to the fifth to the eighth embodiments, the outer cylinder 2 and the inner cylinder 3 are each formed in a cylindrical shape. However, the outer cylinder 2 and the inner cylinder 3 may be each prism-shaped. Moreover, although a dispersed liquid is generated from a plurality of kinds of liquids in the agitating vessel 1, powder of solid particles and a liquid may be contained in the outer cylinder 2 to generate a dispersed liquid (suspension). Moreover, also when the agitating vessel 1 according to any of the fifth to the eighth embodiments may be used as solution generation means for dissolving a solute in a solvent, the same effect can be obtained.

Moreover, although the agitating vessel 1 is used as a package container for the separate liquid dressing 10, the agitating vessel 1 may be used as a package container for another purpose. For example, the agitating vessel 1 may be used as a package container for separate liquid cosmetics containing a pure water and an oil component. Moreover, for example, the agitating vessel 1 may be used as a package container for a pharmaceutical containing a saline and a pharmaceutical which is poorly soluble in water, or as a dissolving vessel for dissolving, in a saline, a pharmaceutical which is poorly soluble in water. In this case, it is possible to reduce a usage amount of dissolution promoter (a substance, such as alcohol or a surfactant, which causes a side effect) for dissolving, in a saline, a pharmaceutical which is poorly soluble in water, or it is possible to avoid the use of the dissolution promoter.

Further, the agitating vessel 1 may be used for a sophisticated detergent-dissolving apparatus for promoting mixture of a detergent and water in a washing machine. The agitating vessel 1 may be used as an extraction apparatus for extracting, into a liquid medium, a soluble component contained in a solid, such as for extracting coffee. The agitating vessel 1 may be used in order to promote mixture in an apparatus for extracting or dissolving a substance using liquid carbon dioxide or supercritical carbon dioxide, or in order to promote mixture of carbon dioxide and a dissolution assistant (entrainer) to be used.

Further, the agitating vessel 1 may be not only used for mixing liquids, but also used in a component separation process for separating a solid from a liquid such as for separating and producing cheese or butter from milk. Thus, high quality condensing and separation for milk fat or protein can be promoted by efficient agitation being performed with reduced strength.

While the present invention has been described with reference to the embodiments, the present invention is not limited to the embodiments. Modifications can be devised, as appropriate, without departing from the scope of the invention.

INDUSTRIAL APPLICABILITY

The present invention is applicable to an agitation mixing apparatus for agitating and mixing a flowing fluid, such as an emulsion production apparatus, an agitator for use in an apparatus for performing pH adjustment and/or causing chemical reaction such as oxidation-reduction reaction, an agitator for use in an extractor, and an agitator used in the biochemical field.

DESCRIPTION OF THE REFERENCE CHARACTERS 1 agitating vessel
2 outer cylinder
3, 9 inner cylinder
4a, 4b, 4c, 4d, 4e grooves
6 lid
8 contents
10 separate liquid dressing
21a to 21f, 22a to 22f vortexes
51 agitation mixing apparatus
52 casing
53 agitator
54 inlet
55 outlet
56 flow path
57 shaft
58, 58a, 58b, 58c, 58d vane
60 fluids-to-be-mixed
71 grooves
72 recess and projection portion
73, 75 recessed portion
74, 76 projecting portion

The invention claimed is:

1. An agitation mixing apparatus comprising: a casing having a flow path in which a fluid flows; an agitator which is disposed inside the casing and includes a shaft and a vane mounted around the shaft; and a drive source, connected to the shaft, for vibrating the agitator in an axial direction, wherein grooves are provided on an inner wall surface of the casing at predetermined intervals in the axial direction, an amplitude of the vibration of the agitator produced by the drive source is larger than a width of the grooves, and recessed portions and projecting portions are provided on a surface of the vane.

2. An agitation mixing apparatus comprising: a casing having a flow path in which a fluid flows; an agitator which is disposed inside the casing and includes a shaft and a vane mounted around the shaft; and a drive source, connected to the shaft, for vibrating the agitator in an axial direction, wherein grooves are provided on an inner wall surface of the casing at predetermined intervals in the axial direction, recessed portions and projecting portions are provided on a surface of the vane, and the vane has the recessed portions and the projecting portions on both surfaces thereof, to contact with a fluid, and the recessed portions formed on one surface and the recessed portions on a surface reverse of the one surface share common side walls, and the recessed portions are radially positioned at predetermined angular intervals.

3. The agitation mixing apparatus according to claim 2, wherein the agitator is rotated about the shaft by the drive source being driven.

4. The agitation mixing apparatus according to claim 3, wherein the agitator repeats a forward rotation and a reverse rotation in a cyclic manner.

5. An agitating vessel for dispersing or separating, by a liquid contained therein being shaken and agitated, the agitated liquid, the agitating vessel comprising: an outer cylinder of a cylindrical shape which has an opening at a top portion and a closed bottom; and a lid which detachably closes the opening; and an inner cylinder of a cylindrical shape which is disposed inside the outer cylinder, wherein grooves are aligned at predetermined intervals in an axial direction on one or both of an inner circumferential surface and an outer circumferential surface of the inner cylinder.

* * * * *